US012791842B2

(12) United States Patent
Shimada

(10) Patent No.: US 12,791,842 B2
(45) Date of Patent: Nov. 10, 2026

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Toshiyuki Shimada, Kawasaki (JP)

(73) Assignee: Nikon Corporation, Tokyo (JP)

( * ) Notice: Subject to any disclaimer, the term of this patent is extended or adjusted under 35 U.S.C. 154(b) by 564 days.

(21) Appl. No.: 18/024,030

(22) PCT Filed: Sep. 27, 2021

(86) PCT No.: PCT/JP2021/035454
§ 371 (c)(1),
(2) Date: Feb. 28, 2023

(87) PCT Pub. No.: WO2022/071249
PCT Pub. Date: Apr. 7, 2022

(65) Prior Publication Data
US 2023/0266571 A1 Aug. 24, 2023

(30) Foreign Application Priority Data
Sep. 30, 2020 (JP) ................................ 2020-164402

(51) Int. Cl.
*G02B 15/14* (2006.01)
*G02B 13/00* (2006.01)

(52) U.S. Cl.
CPC ................ *G02B 15/144107* (2019.08); *G02B 13/0045* (2013.01); *G02B 13/009* (2013.01)

(58) Field of Classification Search
CPC ........ G02B 15/144107; G02B 13/0045; G02B 13/009; G02B 13/02; G02B 13/00; G02B 13/18
(Continued)

(56) References Cited

U.S. PATENT DOCUMENTS 4,621,909 A 11/1986 Hamanishi
5,066,113 A 11/1991 Nakajima et al.
5,172,273 A 12/1992 Yamanashi
5,519,540 A * 5/1996 Suzuki ........... G02B 15/144107 359/686
(Continued)

FOREIGN PATENT DOCUMENTS

JP S58-186714 A 10/1983
JP H09-061708 A 3/1997
(Continued)

OTHER PUBLICATIONS

1 Office Action issued Apr. 22, 2025, in Japanese Patent Application No. 2020-164402.
(Continued)

*Primary Examiner* — Travis S Fissel
(74) *Attorney, Agent, or Firm* — Potomac Law Group, PLLC

(57) ABSTRACT

An optical system (OL) comprises a first lens group (G1) having positive refractive power, an aperture stop (S), and a rear group (GR) that are arranged in order from the object side along an optical axis, the rear group (GR) comprising a first focusing lens group (GF1) that moves along the optical axis during focusing, and a second focusing lens group (GF2) that is disposed closer to the image side than the first focusing lens group (GF1) and moves along the optical axis during focusing, and the optical system satisfies the following conditional expression. 0.03<D1/TL<0.25 where D1 is a distance on the optical axis from a lens surface closest to the object side to a lens surface closest to the image side in the first lens group (G1), and TL is the entire length of the optical system (OL).

24 Claims, 12 Drawing Sheets

(58) Field of Classification Search
USPC .......................................................... 359/676
See application file for complete search history.

(56) References Cited

U.S. PATENT DOCUMENTS

| | | | | |
|---|---|---|---|---|
| 5,835,286 | A | 11/1998 | Yamanashi | |
| 6,014,265 | A * | 1/2000 | Kato | G02B 15/144107 359/686 |
| 6,411,443 | B1 | 6/2002 | Kato et al. | |
| 2004/0207930 | A1 | 10/2004 | Nishio | |
| 2005/0213225 | A1 | 9/2005 | Hosoya | |
| 2013/0242414 | A1 | 9/2013 | Iwamoto | |
| 2015/0312454 | A1 | 10/2015 | Iiyama et al. | |

FOREIGN PATENT DOCUMENTS

| | | | |
|---|---|---|---|
| JP | H11-119102 | A | 4/1999 |
| JP | 2004-334185 | A | 11/2004 |
| JP | 2013-190742 | A | 9/2013 |
| JP | 2019-197125 | A | 11/2019 |
| WO | WO 2014/118865 | A1 | 8/2014 |

OTHER PUBLICATIONS

International Search Report from International Patent Application No. PCT/JP2021/035454, Nov. 30, 2021.

International Preliminary Report on Patentability for International Patent Application No. PCT/JP2021/035454, Apr. 13, 2023.

Office Action issued May 7, 2024, in Japanese Patent Application No. 2020-164402.

Office Action issued May 20, 2025, in Chinese Patent Application No. 202180063836.4.

Office Action issued Mar. 11, 2026, in Chinese Patent Application No. 202180063836.4.

Office Action issued Sep. 1, 2026, in Chinese Patent Application No. 202180063836.4.

* cited by examiner

OPTICAL SYSTEM, OPTICAL APPARATUS AND METHOD FOR MANUFACTURING THE OPTICAL SYSTEM

TECHNICAL FIELD

The present invention relates to an optical system, an optical apparatus, and a method for manufacturing the optical system.

TECHNICAL BACKGROUND

In the related art, a compact single-focus optical system having a wide angle of view has been proposed (for example, see Patent literature 1). In such an optical system, the entire length is increased with respect to the focal length of the optical system.

PRIOR ARTS LIST

Patent Document

Patent literature 1: Japanese Laid-Open Patent Publication No. 2013-190742(A)

SUMMARY OF THE INVENTION

An optical system according to a first aspect of the present invention comprises a first lens group with positive refractive power, an aperture stop, and a succeeding group, which are disposed in order from an object on an optical axis, the succeeding group comprising a first focusing lens group that moves on the optical axis during focusing and a second focusing lens group which is disposed closer to the image than the first focusing lens group and which moves on the optical axis during focusing, wherein the following conditional expression is satisfied:

$$0.03<D1/TL<0.25$$

where

D1: distance on optical axis from lens surface closest to object to lens surface closest to image in the first lens group TL: entire length of the optical system.

An optical system according to a second aspect of the present invention comprises a first lens group with positive refractive power, a second lens group with positive refractive power, a third lens group with positive refractive power, and a fourth lens group with negative refractive power, which are disposed in order from an object on an optical axis, wherein during focusing, distances between adjacent lens groups vary.

An optical system according to a third aspect of the present invention comprises a first lens group with positive refractive power, a second lens group with positive refractive power, a third lens group with positive refractive power, and a fourth lens group with negative refractive power, which are disposed in order from an object on an optical axis, wherein during focusing, the second lens group and the third lens group move on the optical axis, and the following conditional expression is satisfied:

$$0.03<D1/TL<0.25$$

where

D1: distance on optical axis from lens surface closest to object to lens surface closest to image in the first lens group TL: entire length of the optical system.

An optical apparatus according to the present invention comprises the above optical system.

A method for manufacturing an optical system comprising a first lens group with positive refractive power, an aperture stop, and a succeeding group, which are disposed in order from an object on an optical axis according to a first aspect of the present invention: The method comprises a step of disposing the first lens group, the aperture stop and the succeeding group in a lens barrel so that; the succeeding group comprising a first focusing lens group that moves on the optical axis during focusing and a second focusing lens group which is disposed closer to the image than the first focusing lens group and which moves on the optical axis during focusing, wherein the following conditional expression is satisfied:

$$0.03<D1/TL<0.25$$

where

D1: distance on optical axis from lens surface closest to object to lens surface closest to image in the first lens group TL: entire length of the optical system.

A method for manufacturing an optical system comprising a first lens group with positive refractive power, a second lens group with positive refractive power, a third lens group with positive refractive power, and a fourth lens group with negative refractive power, which are disposed in order from an object on an optical axis according to a second aspect of the present invention: The method comprises a step of disposing the first lens group, the second lens group, the third lens group and the fourth lens group in a lens barrel so that; during focusing, distances between adjacent lens groups vary.

A method for manufacturing an optical system comprising a first lens group with positive refractive power, a second lens group with positive refractive power, a third lens group with positive refractive power, and a fourth lens group with negative refractive power, which are disposed in order from an object on an optical axis according to a third aspect of the present invention: The method comprises a step of disposing the first lens group, the second lens group, the third lens group and the fourth lens group in a lens barrel so that; during focusing, the second lens group and the third lens group move on the optical axis, and the following conditional expression is satisfied:

$$0.03<D1/TL<0.25$$

where

D1: distance on optical axis from lens surface closest to object to lens surface closest to image in the first lens group TL: entire length of the optical system.

DESCRIPTION OF THE EMBODIMENTS

Figure 9:
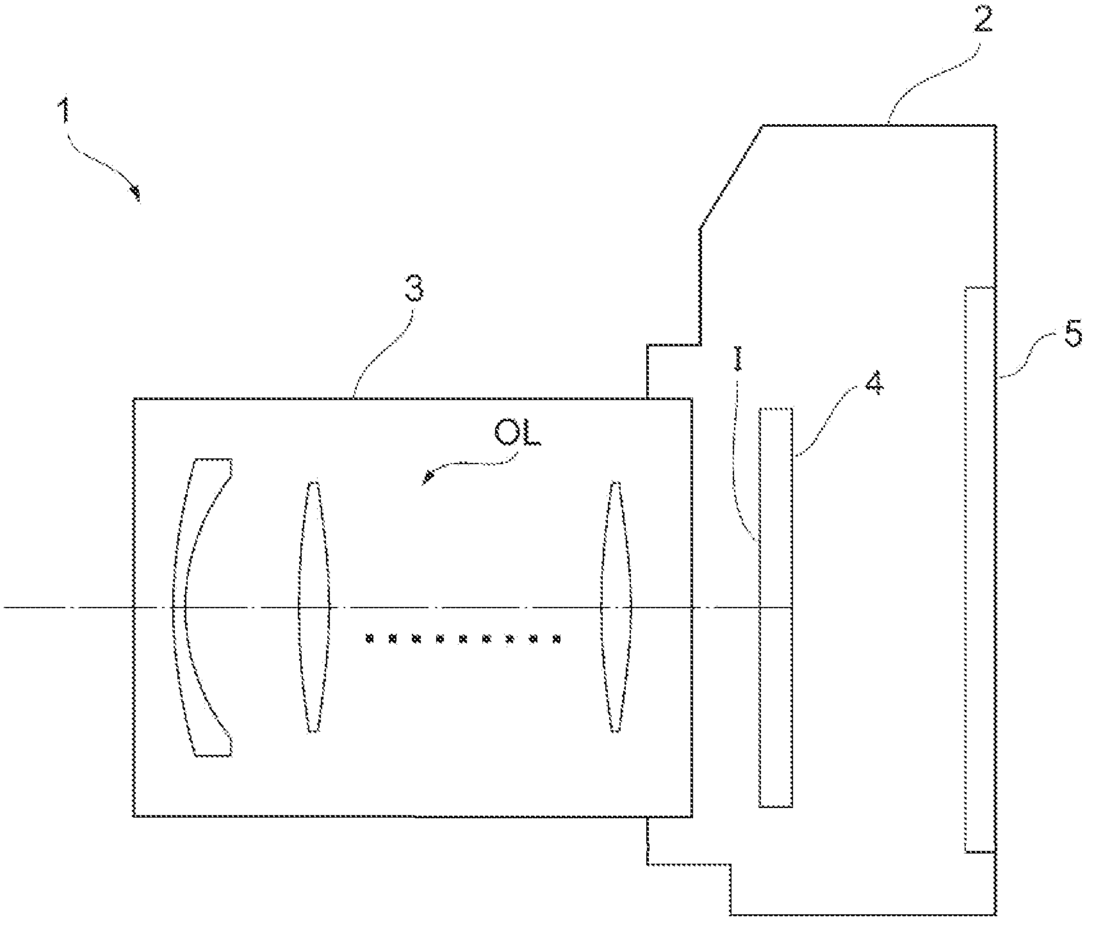
FIG. 9 is a diagram illustrating a configuration of a camera comprising an optical system according to embodiments.

Hereinafter, preferred embodiments according to the present invention will be described. First, a camera (optical apparatus) comprising an optical system according to the embodiments will be described on the basis of FIG. 9. As illustrated in FIG. 9, this camera 1 comprises a main body 2 and a photography lens 3 mounted on the main body 2. The main body 2 comprises an image sensor 4, a main body control part (not illustrated) that controls operations of the digital camera, and an LCD screen 5. The photography lens 3 comprises an optical system OL comprising a plurality of lens groups, and a lens position control mechanism (not illustrated) that controls the position of each lens group. The lens position control mechanism comprises a sensor that detects the positions of the lens groups, a motor that moves the lens groups forward or backward on the optical axis, a control circuit that drives the motor, and the like.

Light from a subject is collected by the optical system OL of the photography lens 3 and reaches an image surface I of the image sensor 4. Light from the subject reaching the image surface I is photoelectrically converted by the image sensor 4 and recorded as digital image data in a memory not illustrated. The digital image data recorded in the memory can be displayed on the LCD screen 5 according to an operation by a user. Note that the camera may be a mirrorless camera, but may also be an SLR camera with a quick-return mirror. Also, the optical system OL illustrated in FIG. 9 is a schematic illustration of an optical system, and the lens configuration of the optical system OL is not limited to this configuration.

Figure 1:
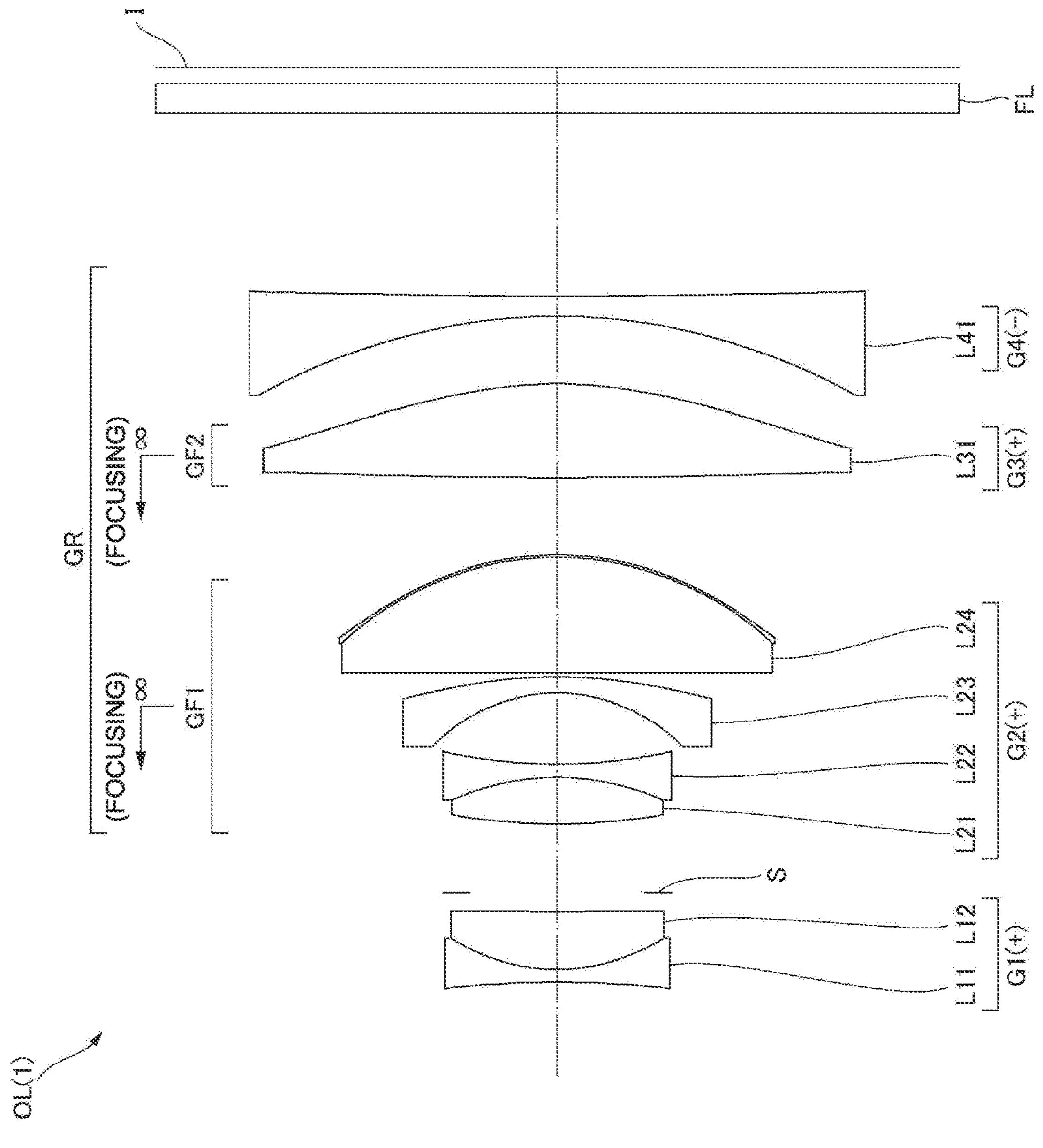
FIG. 1 is a diagram illustrating a lens configuration of an optical system according to a first example.

Next, an optical system according to a first embodiment will be described. As illustrated in FIG. 1, an optical system OL(1) as one example of the optical system OL according to the first embodiment comprises a first lens group G1 with positive refractive power, an aperture stop S, and a succeeding group GR, which are disposed in order from an object on an optical axis. The succeeding group GR comprises a first focusing lens group GF1 that moves on the optical axis during focusing and a second focusing lens group GF2 which is disposed closer to the image than the first focusing lens group GF1 and which moves on the optical axis during focusing. Note that during focusing, it is desirable for the first focusing lens group GF1 and the second focusing lens group GF2 to move with different movement amounts on the optical axis.

Given the above configuration, the optical system OL according to the first embodiment satisfies the following conditional expression (1).

$$0.03 < D1/TL < 0.25 \quad (1)$$

where

D1: distance on the optical axis from the lens surface closest to the object to the lens surface closest to the image in the first lens group G1

TL: entire length of optical system OL

According to the first embodiment, the entire length of the optical system is shortened with respect to the focal length, making it possible to obtain an optical system that is compact while having favorable optical performance as well as an optical apparatus comprising the optical system. The optical system OL according to the first embodiment may also be an optical system OL(2) illustrated in FIG. 3, an optical system OL(3) illustrated in FIG. 5, or an optical system OL(4) illustrated in FIG. 7.

Conditional expression (1) defines an appropriate relationship between the distance on the optical axis from the lens surface closest to the object to the lens surface closest to the image in the first lens group G1, and the entire length of the optical system OL. Satisfying conditional expression (1) allows for a compact optical system while also optimizing the exit pupil position with respect to the image surface (image sensor).

If the corresponding value of conditional expression (1) falls below a lower limit, the first lens group G1 will be too thin, thereby making it difficult to correct chromatic aberration and astigmatic difference. Moreover, the edge thicknesses and center thicknesses of the lenses forming the first lens group G1 will be too thin, thereby making it difficult to manufacture the lenses. By setting the lower limit on conditional expression (1) to 0.05 or even 0.07, the effects of the present embodiment can be further ensured.

If the corresponding value of conditional expression (1) rises above an upper limit, it will be difficult to keep the exit pupil position away from the image surface (image sensor). Attempting to keep the exit pupil position away from the image surface (image sensor) makes it difficult to correct curvature of field. By setting the upper limit on conditional expression (1) to 0.22 or even 0.20, the effects of the present embodiment can be further ensured.

In the optical system OL according to the first embodiment, it is desirable for the succeeding group GR to comprise a second lens group G2 with positive refractive power and a third lens group G3 with positive refractive power, which are disposed in order from the object on the optical axis, and in which the second lens group G2 is the first focusing lens group GF1 and the third lens group G3 is the second focusing lens group GF2. Furthermore, it is desirable for the succeeding group GR to comprise a fourth lens group G4 with negative refractive power disposed on the image side of the third lens group G3. With this arrangement, the entire length of the optical system is shortened with respect to the focal length, and an optical system that is compact while having favorable optical performance can be obtained.

Next, an optical system according to a second embodiment will be described. As illustrated in FIG. 1, an optical system OL(1) as one example of the optical system OL according to the second embodiment comprises a first lens group G1 with positive refractive power, a second lens group G2 with positive refractive power, a third lens group G3 with positive refractive power, and a fourth lens group G4 with negative refractive power, which are disposed in order from an object on an optical axis. During focusing, the distances between adjacent lens groups vary.

According to the second embodiment, the entire length of the optical system is shortened with respect to the focal length, making it possible to obtain an optical system that is compact while having favorable optical performance as well as an optical apparatus comprising the optical system. The optical system OL according to the second embodiment may also be an optical system OL(2) illustrated in FIG. 3, an optical system OL(3) illustrated in FIG. 5, or an optical system OL(4) illustrated in FIG. 7. It is desirable for the optical system OL according to the second embodiment to comprise an aperture stop S disposed between the first lens group G1 and the second lens group G2.

It is desirable for the optical system OL according to the second embodiment to satisfy the above conditional expression (1). Like the case of the first embodiment, satisfying conditional expression (1) allows for a compact optical system while also optimizing the exit pupil position with respect to the image surface (image sensor). Also, by setting the lower limit on conditional expression (1) to 0.05 or even 0.07, the effects of the present embodiment can be further ensured. By setting the upper limit on conditional expression (1) to 0.22 or even 0.20, the effects of the present embodiment can be further ensured.

Next, an optical system according to a third embodiment will be described. As illustrated in FIG. 1, an optical system OL(1) as one example of the optical system OL according to the third embodiment comprises a first lens group G1 with positive refractive power, a second lens group G2 with positive refractive power, a third lens group G3 with positive refractive power, and a fourth lens group G4 with negative refractive power, which are disposed in order from an object on an optical axis. During focusing, the second lens group G2 and the third lens group G3 move on the optical axis. Note that during focusing, it is desirable for the distances between adjacent lens groups to vary.

Given the above configuration, the optical system OL according to the third embodiment satisfies the above conditional expression (1). According to the third embodiment, the entire length of the optical system is shortened with respect to the focal length, making it possible to obtain an optical system that is compact while having favorable optical performance as well as an optical apparatus comprising the optical system. The optical system OL according to the third embodiment may also be an optical system OL(2) illustrated in FIG. 3, an optical system OL(3) illustrated in FIG. 5, or an optical system OL(4) illustrated in FIG. 7. It is desirable for the optical system OL according to the third embodiment to comprise an aperture stop S disposed between the first lens group G1 and the second lens group G2.

Also, similarly to the case of the first embodiment, satisfying conditional expression (1) allows for a compact optical system while also optimizing the exit pupil position with respect to the image surface (image sensor). Also, by setting the lower limit on conditional expression (1) to 0.05 or even 0.07, the effects of the present embodiment can be further ensured. By setting the upper limit on conditional expression (1) to 0.22 or even 0.20, the effects of the present embodiment can be further ensured.

It is desirable for the optical system OL according to the first to third embodiments to satisfy the following conditional expression (2).

$$1.20<(-f4)/f<2.00 \quad (2)$$

where f4: focal length of fourth lens group G4 f: focal length of optical system OL

Conditional expression (2) defines a suitable range for the refractive power of the fourth lens group G4. By satisfying conditional expression (2), chromatic aberration of magnification, distortion, and curvature of field can be corrected favorably.

If the corresponding value of conditional expression (2) falls below a lower limit, the refractive power of the fourth lens group G4 will be too strong, thereby making it difficult to correct chromatic aberration of magnification and distortion. Also, keeping the exit pupil position away from the image surface (image sensor) will be difficult. By setting the lower limit on conditional expression (2) to 1.40 or even 1.50, the effects of each embodiment can be further ensured.

If the corresponding value of conditional expression (2) rises above an upper limit, the refractive power of the fourth lens group G4 will be too weak, thereby making it difficult to correct curvature of field. By setting the upper limit on conditional expression (2) to 1.85 or even 1.80, the effects of each embodiment can be further ensured.

It is desirable for the optical system OL according to the first to third embodiments to satisfy the following conditional expression (3).

$$1.10<\beta 4<1.40 \quad (3)$$

where

β4: lateral magnification of fourth lens group G4 upon focusing on infinity

Conditional expression (3) defines a suitable range for the lateral magnification of the fourth lens group G4. Satisfying conditional expression (3) allows for a compact optical system while also obtaining favorable optical performance.

If the corresponding value of conditional expression (3) falls below a lower limit, the optical system will be bulky and at the same time, correcting curvature of field will be difficult. By setting the lower limit on conditional expression (3) to 1.17, the effects of each embodiment can be further ensured.

If the corresponding value of conditional expression (3) rises above an upper limit, correction of curvature of field and distortion will be difficult. By setting the upper limit on conditional expression (3) to 1.35, the effects of each embodiment can be further ensured.

In the optical system OL according to the first to third embodiments, it is desirable for the fourth lens group G4 to comprise a single negative lens and to satisfy the following conditional expression (4).

$$28.0<\nu d41<45.0 \quad (4)$$

where

νd41: Abbe number based on d-line of negative lens of fourth lens group G4

Conditional expression (4) defines a suitable range for the Abbe number of the negative lens forming the fourth lens group G4. By satisfying conditional expression (4), chromatic aberration of magnification can be corrected favorably.

If the corresponding value of conditional expression (4) falls below a lower limit, chromatic aberration of magnification will be over-corrected. By setting the lower limit on conditional expression (4) to 30.0 or even 32.0, the effects of each embodiment can be further ensured.

If the corresponding value of conditional expression (4) rises above an upper limit, correction of chromatic aberration of magnification will be inadequate. By setting the upper limit on conditional expression (4) to 43.0 or even 41.0, the effects of each embodiment can be further ensured.

It is desirable for the optical system OL according to the first to third embodiments to satisfy the following conditional expression (5).

$$0.50<f2/f3<2.00 \quad (5)$$

where f2: focal length of second lens group G2 f3: focal length of third lens group G3

Conditional expression (5) defines an appropriate relationship between the focal length of the second lens group G2 and the focal length of the third lens group G3. By satisfying conditional expression (5), astigmatic difference and curvature of field can be corrected favorably.

If the corresponding value of conditional expression (5) falls below a lower limit, the refractive power of the third lens group G3 will be too weak, thereby making it difficult to correct astigmatic difference. By setting the lower limit on conditional expression (5) to 0.60 or even 0.70, the effects of each embodiment can be further ensured.

If the corresponding value of conditional expression (5) rises above an upper limit, the refractive power of the third lens group G3 will be too strong, thereby making it difficult to correct curvature of field. By setting the upper limit on conditional expression (5) to 1.90 or even 1.80, the effects of each embodiment can be further ensured.

It is desirable for the optical system OL according to the first to third embodiments to satisfy the following conditional expression (6).

$$0.04<d23/TL<0.11 \quad (6)$$

where d23: distance on optical axis between second lens group G2 and third lens group G3 upon focusing on infinity TL: entire length of optical system OL Conditional expression (6) defines an appropriate relationship between the distance on the optical axis between the second lens group G2 and the third lens group G3, and the entire length of the optical system OL. By satisfying conditional expression (6), moving space for each lens group necessary for focusing can be secured, and favorable optical performance can also be obtained upon focusing close-up.

If the corresponding value of conditional expression (6) falls below a lower limit, moving space for each lens group necessary for focusing will be inadequate, and moreover, correction of astigmatism upon focusing close-up will be difficult. By setting the lower limit on conditional expression (6) to 0.05, the effects of each embodiment can be further ensured.

If the corresponding value of conditional expression (6) rises above an upper limit, correction of coma aberration upon focusing close-up will be difficult. By setting the upper limit on conditional expression (6) to 0.10, the effects of each embodiment can be further ensured.

It is desirable for the optical system OL according to the first to third embodiments to satisfy the following conditional expression (7).

$$0.60<d23/d12<1.00 \quad (7)$$

where d23: distance on optical axis between second lens group G2 and third lens group G3 upon focusing on infinity d12: distance on optical axis between first lens group G1 and second lens group G2 upon focusing on infinity Conditional expression (7) defines an appropriate relationship between the distance on the optical axis between the second lens group G2 and the third lens group G3, and the distance on the optical axis between the first lens group G1 and the second lens group G2. By satisfying conditional expression (7), moving space for each lens group necessary for focusing can be secured, and favorable optical performance can also be obtained upon focusing close-up.

If the corresponding value of conditional expression (7) falls below a lower limit, correction of astigmatism upon focusing close-up will be difficult. By setting the lower limit on conditional expression (7) to 0.67, the effects of each embodiment can be further ensured.

If the corresponding value of conditional expression (7) rises above an upper limit, correction of coma aberration upon focusing close-up will be difficult. By setting the upper limit on conditional expression (7) to 0.92, the effects of each embodiment can be further ensured.

It is desirable for the optical system OL according to the first to third embodiments to satisfy the following conditional expression (8).

$$0.10<\beta 2/\beta 3<0.90 \quad (8)$$

where

β2: lateral magnification of second lens group G2 upon focusing on infinity

β3: lateral magnification of third lens group G3 upon focusing on infinity

Conditional expression (8) defines an appropriate relationship between the lateral magnification of the second lens group G2 and the lateral magnification of the third lens group G3. By satisfying conditional expression (8), favorable optical performance can also be obtained upon focusing close-up.

If the corresponding value of conditional expression (8) falls below a lower limit, correction of astigmatism upon focusing close-up will be difficult. By setting the lower limit on conditional expression (8) to 0.18, the effects of each embodiment can be further ensured.

If the corresponding value of conditional expression (8) rises above an upper limit, correction of coma aberration upon focusing close-up will be difficult. By setting the upper limit on conditional expression (8) to 0.80, the effects of each embodiment can be further ensured.

It is desirable for the optical system OL according to the first to third embodiments to satisfy the following conditional expression (9).

$$0.015<\{\beta 2+(1/\beta 2)\}^{-2}<0.170 \quad (9)$$

where

β2: lateral magnification of second lens group G2 upon focusing on infinity

Conditional expression (9) defines a suitable range for the lateral magnification of the second lens group G2. By satisfying conditional expression (9), the movement amount by which the second lens group moves to go from focusing on infinity to focusing close-up can be reduced to allow for a more compact lens, and favorable optical performance can be obtained.

If the corresponding value of conditional expression (9) falls below a lower limit, correction of spherical aberration and longitudinal chromatic aberration will be difficult. By setting the lower limit on conditional expression (9) to 0.020, the effects of each embodiment can be further ensured.

If the corresponding value of conditional expression (9) rises above an upper limit, the movement amount by which the second lens group moves to go from focusing on infinity to focusing close-up will be increased, resulting in a bulkier lens, and correction of astigmatism will be difficult. By setting the upper limit on conditional expression (9) to 0.150, the effects of each embodiment can be further ensured.

It is desirable for the optical system OL according to the first to third embodiments to satisfy the following conditional expression (10).

$$0.100<\{\beta 3+(1/\beta 3)\}^{-2}<0.250 \quad (10)$$

where

β3: lateral magnification of third lens group G3 upon focusing on infinity

Conditional expression (10) defines a suitable range for the lateral magnification of the third lens group G3. By satisfying conditional expression (10), the movement amount by which the third lens group moves to go from focusing on infinity to focusing close-up can be reduced to allow for a more compact lens, and favorable optical performance can be obtained.

If the corresponding value of conditional expression (10) falls below a lower limit, correction of curvature of field and astigmatism will be difficult. By setting the lower limit on conditional expression (10) to 0.160, the effects of each embodiment can be further ensured.

If the corresponding value of conditional expression (10) rises above an upper limit, the movement amount by which the third lens group moves to go from focusing on infinity to focusing close-up will be increased, resulting in a bulkier lens, and correction of astigmatism will be difficult. By setting the upper limit on conditional expression (10) to 0.230, the effects of each embodiment can be further ensured.

In the optical system OL according to the first to third embodiments, it is desirable for the second lens group G2 to comprise a first positive lens, a first negative lens, a second negative lens, and a second positive lens, which are disposed in order from the object on the optical axis. Also, it is desirable for the second lens group G2 to comprise: a positive lens component comprising the first positive lens and the first negative lens; the second negative lens; and the second positive lens, which are disposed in order from the object on the optical axis. With this arrangement, longitudinal chromatic aberration, spherical aberration, coma aberration, astigmatic difference, and the like can be corrected favorably while also suitably reducing the Petzval sum to correct curvature of field favorably.

It is desirable for the optical system OL according to the first to third embodiments to satisfy the following conditional expression (11).

$$0.00<N21-N22<0.40 \quad (11)$$

where

N21: refractive index for d-line of first positive lens of second lens group G2

N22: refractive index for d-line of first negative lens of second lens group G2

Conditional expression (11) defines a suitable range for the difference between the refractive index of the first positive lens and the refractive index of the first negative lens in the second lens group G2. By satisfying conditional expression (11), curvature of field and spherical aberration can be corrected favorably.

If the corresponding value of conditional expression (11) falls below a lower limit, correcting curvature of field will be difficult. By setting the lower limit on conditional expression (11) to 0.10 or even 0.15, the effects of each embodiment can be further ensured.

If the corresponding value of conditional expression (11) rises above an upper limit, correcting spherical aberration will be difficult. By setting the upper limit on conditional expression (11) to 0.35 or even 0.30, the effects of each embodiment can be further ensured.

It is desirable for the optical system OL according to the first to third embodiments to satisfy the following conditional expression (12).

$$N21>1.90 \quad (12)$$

where

N21: refractive index for d-line of first positive lens of second lens group G2

Conditional expression (12) defines a suitable range for the refractive index of the first positive lens in the second lens group G2. By satisfying conditional expression (12), the Petzval sum can be reduced without making spherical aberration and coma aberration worse, and curvature of field can be corrected favorably.

If the corresponding value of conditional expression (12) falls below a lower limit, the Petzval sum will increase and correction of curvature of field will be difficult. By setting the lower limit on conditional expression (12) to 1.95, the effects of each embodiment can be further ensured.

It is desirable for the optical system OL according to the first to third embodiments to satisfy the following conditional expression (13).

$$25.0<\nu d21<35.0 \quad (13)$$

where

νd21: Abbe number based on d-line of first positive lens of second lens group G2

Conditional expression (13) defines a suitable range for the Abbe number of the first positive lens in the second lens group G2. By satisfying conditional expression (13), longitudinal chromatic aberration can be corrected favorably.

If the corresponding value of conditional expression (13) falls below a lower limit, longitudinal chromatic aberration will be under-corrected and favorable correction will be difficult. By setting the lower limit on conditional expression (13) to 28.0, the effects of each embodiment can be further ensured.

If the corresponding value of conditional expression (13) rises above an upper limit, longitudinal chromatic aberration will be over-corrected and favorable correction will be difficult. By setting the upper limit on conditional expression (13) to 31.0, the effects of each embodiment can be further ensured.

In the optical system OL according to the first to third embodiments, it is desirable for the third lens group G3 to comprise a single positive lens. This arrangement allows for a compact optical system while also correcting curvature of field favorably.

It is desirable for the optical system OL according to the first to third embodiments to satisfy the following conditional expression (14).

$$-1.20<(R31+R32)/(R32-R31)<0.00 \quad (14)$$

where

R31: paraxial radius of curvature of lens surface on object side of positive lens of third lens group G3

R32: paraxial radius of curvature of lens surface on image side of positive lens of third lens group G3

Conditional expression (14) defines a suitable range for the shape factor of the positive lens forming the third lens group G3. By satisfying conditional expression (14), spherical aberration and astigmatism can be corrected favorably.

If the corresponding value of conditional expression (14) falls below a lower limit, correction of spherical aberration will be difficult. By setting the lower limit on conditional expression (14) to −1.05, the effects of each embodiment can be further ensured.

If the corresponding value of conditional expression (14) rises above an upper limit, correction of astigmatism will be difficult. By setting the upper limit on conditional expression (14) to −0.10, the effects of each embodiment can be further ensured.

It is desirable for the optical system OL according to the first to third embodiments to satisfy the following conditional expression (15).

$$0.00<f/f1<0.70 \quad (15)$$

where f: focal length of optical system OL f1: focal length of first lens group G1

Conditional expression (15) defines a suitable range for the refractive power of the first lens group G1. By satisfying conditional expression (15), spherical aberration, curvature of field, and astigmatic difference can be corrected favorably.

If the corresponding value of conditional expression (15) falls below a lower limit, correcting spherical aberration will be difficult. By setting the lower limit on conditional expression (15) to 0.10 or even 0.13, the effects of each embodiment can be further ensured.

If the corresponding value of conditional expression (15) rises above an upper limit, correcting curvature of field and astigmatic difference will be difficult. By setting the upper limit on conditional expression (15) to 0.50 or even 0.35, the effects of each embodiment can be further ensured.

In the optical system OL according to the first to third embodiments, it is desirable for the first lens group G1 to comprise at least two lenses. With this arrangement, longitudinal chromatic aberration, spherical aberration, and coma aberration can be corrected favorably.

In the optical system OL according to the first to third embodiments, it is desirable for the first lens group G1 to comprise a negative lens disposed closest to the object. With this arrangement, astigmatism can be corrected favorably.

Figure 10:
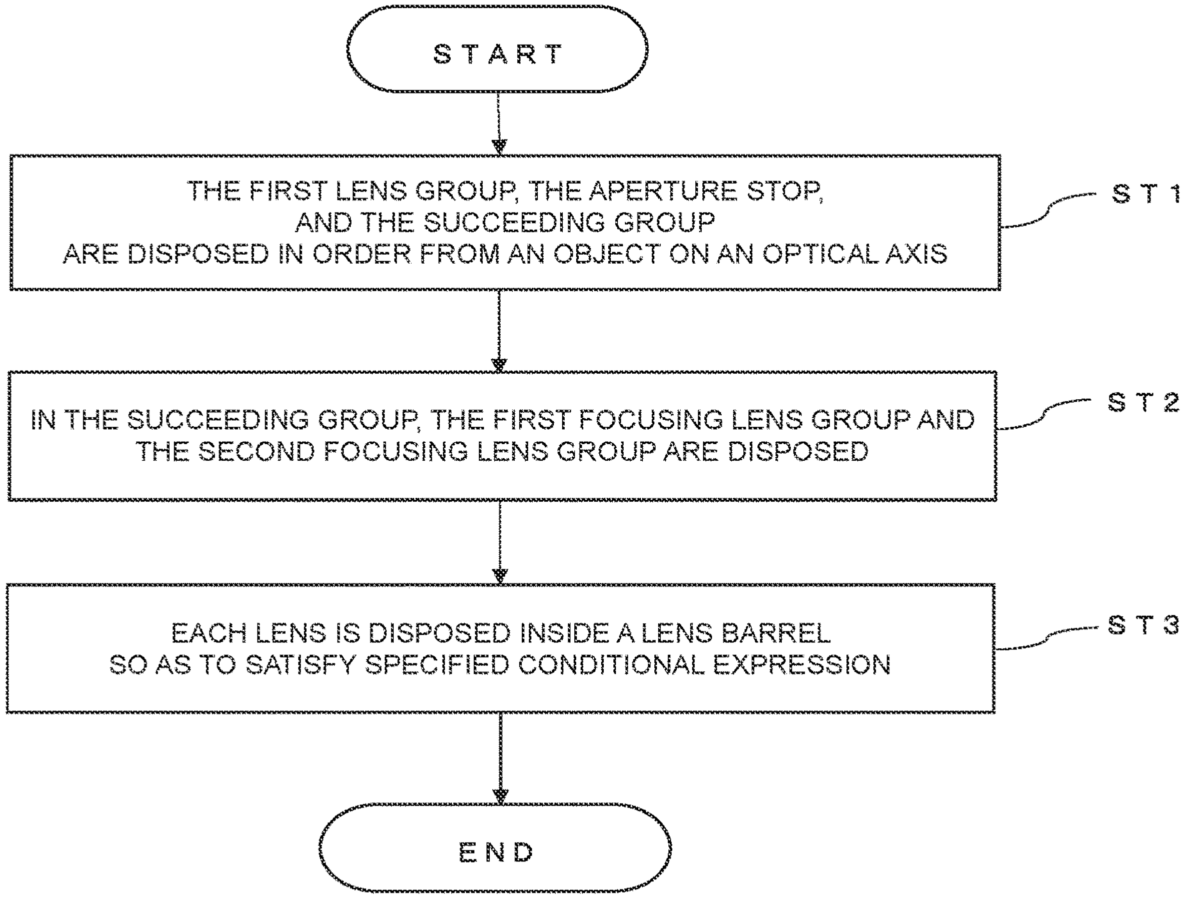
FIG. 10 is a flowchart illustrating a method for manufacturing the optical system according to a first embodiment.

Next, a method for manufacturing the optical system OL according to the first embodiment will be summarized with reference to FIG. 10. First, the first lens group G1 with positive refractive power, the aperture stop S, and the succeeding group GR are disposed in order from an object on an optical axis (step ST1). Next, in the succeeding group GR, the first focusing lens group GF1 that moves on the optical axis during focusing and the second focusing lens group GF2 which is closer to the image than the first focusing lens group GF1 and which moves on the optical axis during focusing are disposed (step ST2). Additionally, each lens is disposed inside a lens barrel so that at least the above conditional expression (1) is satisfied (step ST3). According to such a manufacturing method, the entire length of the optical system is shortened with respect to the focal length, making it possible to manufacture an optical system that is compact while having favorable optical performance.

Figure 11:
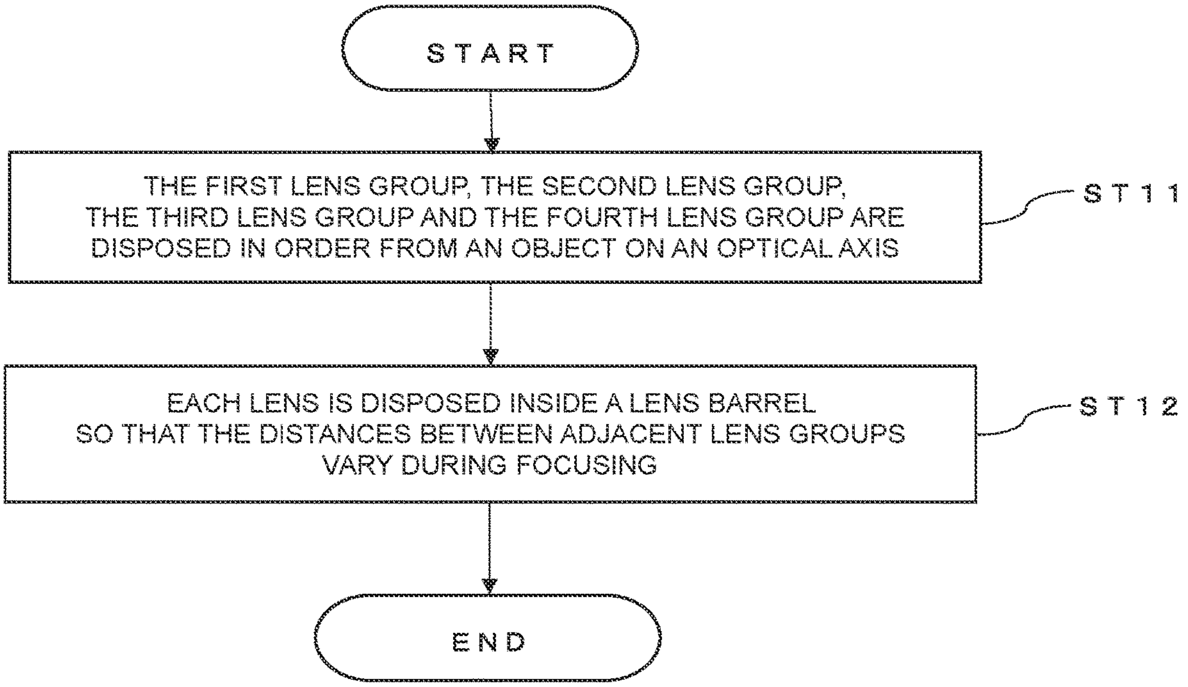
FIG. 11 is a flowchart illustrating a method for manufacturing the optical system according to a second embodiment.

Next, a method for manufacturing the optical system OL according to the second embodiment will be summarized with reference to FIG. 11. First, the first lens group G1 with positive refractive power, the second lens group G2 with positive refractive power, the third lens group G3 with positive refractive power, and the fourth lens group G4 with negative refractive power are disposed in order from an object on an optical axis (step ST11). Additionally, each lens is disposed inside a lens barrel so that the distances between adjacent lens groups vary during focusing (step ST12). According to such a manufacturing method, the entire length of the optical system is shortened with respect to the focal length, making it possible to manufacture an optical system that is compact while having favorable optical performance.

Figure 12:
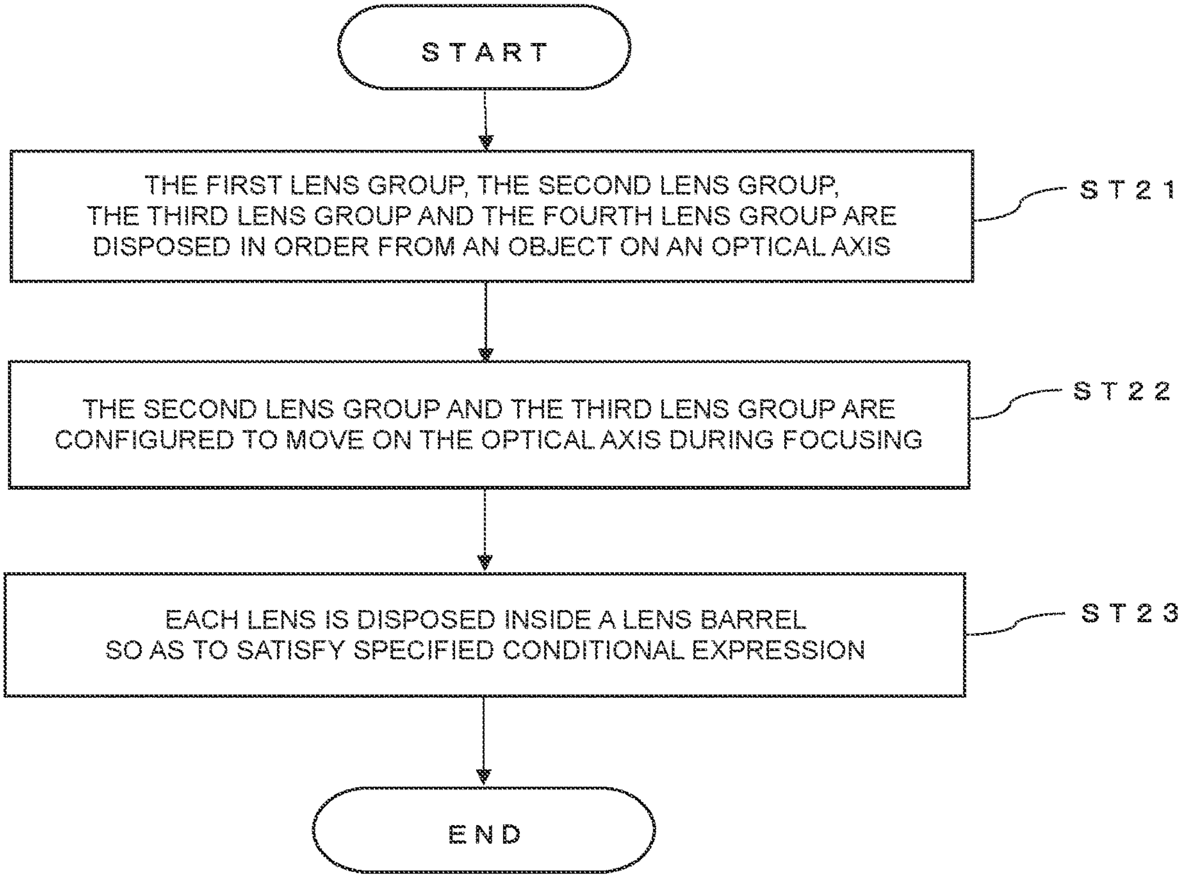
FIG. 12 is a flowchart illustrating a method for manufacturing the optical system according to a third embodiment.

Next, a method for manufacturing the optical system OL according to the third embodiment will be summarized with reference to FIG. 12. First, the first lens group G1 with positive refractive power, the second lens group G2 with positive refractive power, the third lens group G3 with positive refractive power, and the fourth lens group G4 with negative refractive power are disposed in order from an object on an optical axis (step ST21). Next, the second lens group G2 and the third lens group G3 are configured to move on the optical axis during focusing (step ST22). Additionally, each lens is disposed inside a lens barrel so that at least the above conditional expression (1) is satisfied (step ST23). According to such a manufacturing method, the entire length of the optical system is shortened with respect to the focal length, making it possible to manufacture an optical system that is compact while having favorable optical performance.

EXAMPLES

Hereinafter, optical systems OL according to examples of the embodiments will be described on the basis of the drawings. FIGS. 1, 3, 5, and 7 are cross sections illustrating the configuration and refractive power distribution of an optical system OL {OL(1) to OL(4)} according to first to fourth examples. In the cross sections of the optical systems OL(1) to OL(4) according to the first to fourth examples, arrows are used to indicate the direction in which each lens group moves on the optical axis to go from focusing on infinity to focusing on a short distance object.

In FIGS. 1, 3, 5, and 7, each lens group is denoted by the combination of the letter G and a numeral, while each lens is denoted by the combination of the letter L and a numeral. In this case, to prevent the types and numbers of letters and numbers from becoming too large and cumbersome, the combinations of letters and numerals are used independently for each example to represent the lens groups and the like. Accordingly, even if the same combination of a letter and a numeral is used in multiple examples, this does not mean that the configuration is the same.

Tables 1 to 4 are given below, and of these, Tables 1, 2, 3, and 4 indicate data for each of the first, second, third, and fourth examples, respectively. In each example, the d-line (wavelength λ=587.6 nm) and the g-line (wavelength λ=435.8 nm) are chosen as the targets for calculating aberration characteristics.

In the [General Data] table, f represents the focal length of the whole lens, FNO represents the f-number, ω represents the half angle of view (maximum incident angle, units in "°"), and Y represents the image height. Also, TL represents the distance on the optical axis from the lens forefront surface to the lens last surface plus BF, and BF represents the distance (back focus) on the optical axis from the lens last surface to the image surface I. Also, BFa represents the air equivalent length of the back focus. Also, in the [General Data] Table, β2 represents the lateral magnification of the second lens group upon focusing on infinity. Also, β3 represents the lateral magnification of the third lens group upon focusing on infinity. Also, β4 represents the lateral magnification of the fourth lens group upon focusing on infinity.

In the [Lens Data] table, surface number represents the order of the optical surface from the object in the direction in which a light beam travels, R represents the radius of curvature of each optical surface (the surface whose center of curvature is located on the image side is positive), D represents the surface distance, that is, the distance on the optical axis from each optical surface to the next optical surface (or the image surface), nd represents the refractive index for the d-line of the material of the optical member, and νd represents the Abbe number based on the d-line of the material of the optical member. A radius of curvature of "∞" represents a planar surface or an aperture, and (aperture stop S) represents the aperture stop S. The refractive index nd=1.00000 of air is omitted. In the case in which the optical surface is an aspherical surface, the surface number is denoted with an asterisk (*) and the paraxial radius of curvature is indicated in the radius of curvature R column.

In the [Aspherical Surface Data] table, the shape of each aspherical surface listed in [Lens Data] is expressed by the following expression (A). Here, y represents the height in the direction perpendicular to the optical axis, X(y) represents the distance (sag amount) in the optical axis direction from the tangent plane of the apex of the aspherical surface at the height y to the aspherical surface, R represents the radius of curvature (paraxial radius of curvature) of a reference spherical surface, κ represents the conical coefficient, and Ai represents the i-th aspherical coefficient. Also, "E-n" represents "$\times 10^{-n}$". For example, 1.234E-05=$1.234\times 10^{-5}$. Note that the 2nd aspherical coefficient A2 is 0 and is omitted.

$$X(y)=(y^2/R)/\{1+(1-\kappa\times y^2/R^2)^{1/2}\}+A4\times y^4+A6\times y^6+A8\times y^8+A10\times y^{10}+A12\times y^{12}+A14\times y^{14} \quad (A)$$

The [Variable Distance Data] table indicates the surface distance at the surface number i for which the surface distance is (Di) in the [Lens Data] table. In the [Variable Distance Data] table, f represents the focal length of the whole lens, and β represents the photographing magnification. Also, D0 represents the distance from the object to the lens surface closest to the object in the optical system. Note that infinity denotes focusing on an object at infinity, and short distance denotes focusing on a short distance object (object at the shortest photographing distance).

In the [Lens Group Data] table, the first surface (surface closest to the object) and the focal length of each lens group are indicated.

In all of the following data, the listed focal length f, radius of curvature R, surface distance D, and other such lengths generally use "mm" unless noted otherwise, but are not limited thereto since the optical system can be proportionally enlarged or proportionally reduced to obtain the same optical performance.

The above description of tables applies to all of the examples, and duplicate description is omitted from the following.

First Example

The first example will be described using FIGS. 1, 2A, 2B and Table 1. FIG. 1 is a diagram illustrating a lens configuration, upon focusing on infinity, of an optical system according to the first example. The optical system OL(1) according to the first example comprises a first lens group G1 with positive refractive power, an aperture stop S, a second lens group G2 with positive refractive power, a third lens group G3 with positive refractive power, and a fourth lens group G4 with negative refractive power, which are disposed in order from an object on an optical axis. When going from focusing on an object at infinity to a short distance object (object at the shortest photographing distance), the second lens group G2 and the third lens group G3 move toward the object by different movement amounts on the optical axis, and the distances between adjacent lens groups vary. Note that during focusing, the first lens group G1, the aperture stop S, and the fourth lens group G4 are locked in position relative to the image surface I. The sign (+) or (−) beside each lens group sign indicates the refractive power of each lens group, and is used similarly in all of the following examples.

In this example, the second lens group G2, the third lens group G3, and the fourth lens group G4 form the succeeding group GR with positive refractive power as a whole. Also, the second lens group G2 corresponds to the first focusing lens group GF1 in the succeeding group GR. The third lens group G3 corresponds to the second focusing lens group GF2 in the succeeding group GR.

The first lens group G1 comprises a cemented lens with positive refractive power in which a negative lens L11 and a positive lens L12 are cemented in order from the object. In other words, the first lens group G1 comprises a single lens component. The lens surface of the positive lens L12 on the image side is an aspherical surface.

The second lens group G2 comprises a cemented lens with positive refractive power in which a first positive lens L21 and a first negative lens L22 are cemented, a second negative lens L23, and a second positive lens L24, which are disposed in order from the object on the optical axis. The second positive lens L24 is a hybrid lens comprising a glass lens body with a resin layer provided on the surface on the image side. The surface of the resin layer on the image side is an aspherical surface, and the second positive lens L24 is a compound aspherical surface lens. In the [Lens Data] described later, surface number 10 represents the surface of the lens body on the object side, surface number 11 represents the surface of the lens body on the image side and the surface of the resin layer on the object side (the surface where the two are cemented), and surface number 12 represents the surface of the resin layer on the image side.

The third lens group G3 comprises a single positive lens 31. The lens surface of the positive lens 31 on the image side is an aspherical surface.

The fourth lens group G4 comprises a single negative lens 41. The image surface I is disposed on the image side of the fourth lens group G4. A removable and interchangeable optical filter FL is disposed between the fourth lens group G4 and the image surface I. For example, a neutral color filter (NC filter), a color filter, a polarization filter, a neutral density filter (ND filter), an infrared cut filter (IR cut filter), an ultraviolet cut filter (UV cut filter), or the like is used as the optical filter FL. Note that the same applies to the optical filter FL described in the second to fourth examples described later. Also, at the image surface I, an image sensor (not illustrated) comprising a CCD, CMOS, or other type of sensor is disposed.

The following Table 1 gives data values of the optical system according to the first example.

TABLE 1

| [General Data] |
|---|
| f = 28.819 |
| FNO = 2.867 |
| ω = 37.317 |

TABLE 1-continued

| |
|---|
| Y = 21.700 |
| TL = 50.000 |
| Bf = 0.860 |
| Bfa = 11.955 |
| β2 = 0.441 |
| β3 = 0.571 |
| β4 = 1.266 |

[Lens Data]

| Surface Number | R | D | nd | νd |
|---|---|---|---|---|
| Object Surface | ∞ | | | |
| 1 | −60.48802 | 0.700 | 1.59270 | 35.27 |
| 2 | 11.61464 | 3.100 | 1.85135 | 40.13 |
| 3* | 561.56916 | 1.000 | | |
| 4 | ∞ | (D4) | | (Aperture Stop S) |
| 5 | 35.50000 | 2.500 | 2.00100 | 29.12 |
| 6 | −14.64116 | 0.700 | 1.72825 | 28.38 |
| 7 | 30.24772 | 3.950 | | |
| 8 | −9.76003 | 0.900 | 1.84666 | 23.80 |
| 9 | −30.93498 | 0.200 | | |
| 10 | ∞ | 6.300 | 1.77250 | 49.62 |
| 11 | −17.91507 | 0.100 | 1.56093 | 36.64 |
| 12* | −17.00000 | (D12) | | |
| 13 | 414.76419 | 5.100 | 1.80139 | 45.46 |
| 14* | −27.47335 | (D14) | | |
| 15 | −34.00000 | 1.100 | 1.67270 | 32.19 |
| 16 | 500.00000 | 10.040 | | |
| 17 | ∞ | 1.600 | 1.51680 | 63.88 |
| 18 | ∞ | BF | | |
| Image Surface | ∞ | | | |

[Aspherical Surface Data]

3rd Surface

κ = 1.00000E+00, A4 = 1.25556E−05, A6 = 1.12657E−07, A8 = 0.00000E+00 A10 = −5.00000E−12, A12 = 0.00000E+00, A14 = 0.00000E+00

12th Surface

κ = 1.00000E+00, A4 = 2.16700E−05, A6 = −5.98193E−08, A8 = 8.79250E−10 A10 = −1.62238E−12, A12 = 4.08020E−15, A14 = 0.00000E+00

14th Surface

κ = 1.00000E+00, A4 = 1.90302E−05, A6 = 5.11786E−08, A8 = −1.22839E−10 A10 = 1.54556E−13, A12 = −5.38110E−17, A14 = 0.00000E+00

[Variable Distance Data]

| | Infinity f = 28.819 | Short-distance β = −0.196 |
|---|---|---|
| D0 | ∞ | 140.000 |
| D4 | 3.850 | 2.550 |
| D12 | 4.300 | 1.296 |
| D14 | 3.700 | 8.004 |

[Lens Group Data]

| Group | First surface | Focal length |
|---|---|---|
| G1 | 1 | 90.286 |
| G2 | 5 | 57.993 |
| G3 | 13 | 32.318 |
| G4 | 15 | −47.285 |

Figure 2A:
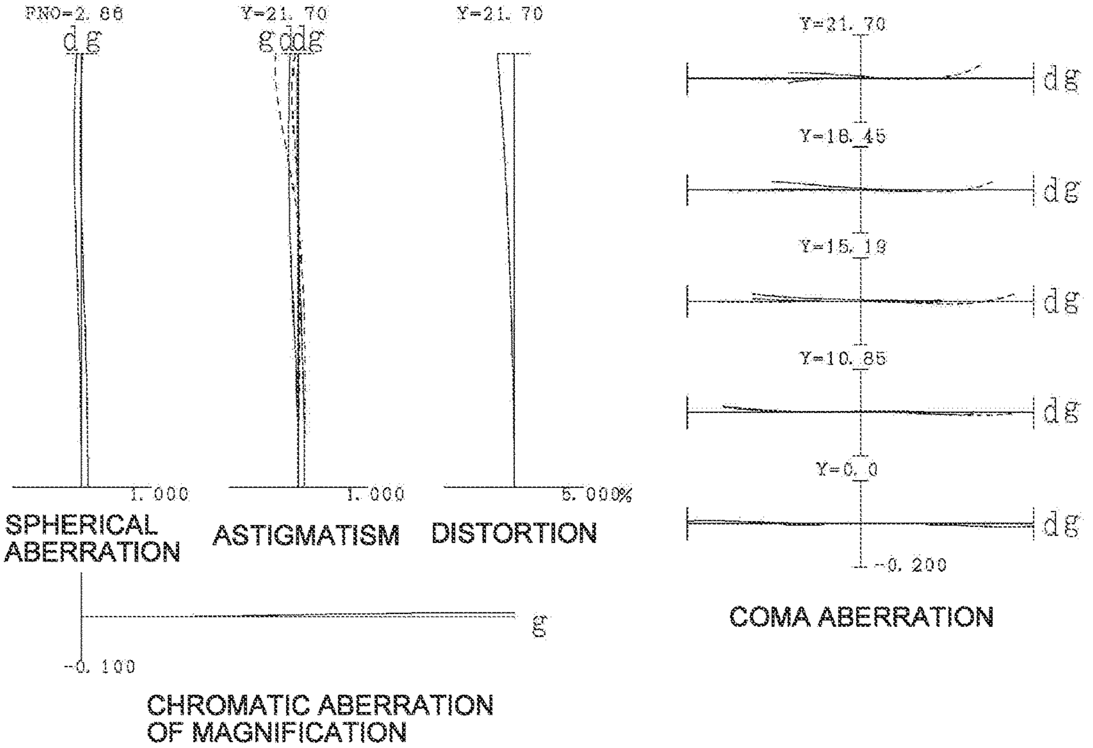
FIGS. 2A and 2B are graphs showing various aberrations of the optical system according to the first example upon focusing on infinity and upon focusing on the shortest photographing distance.
Figure 2B:
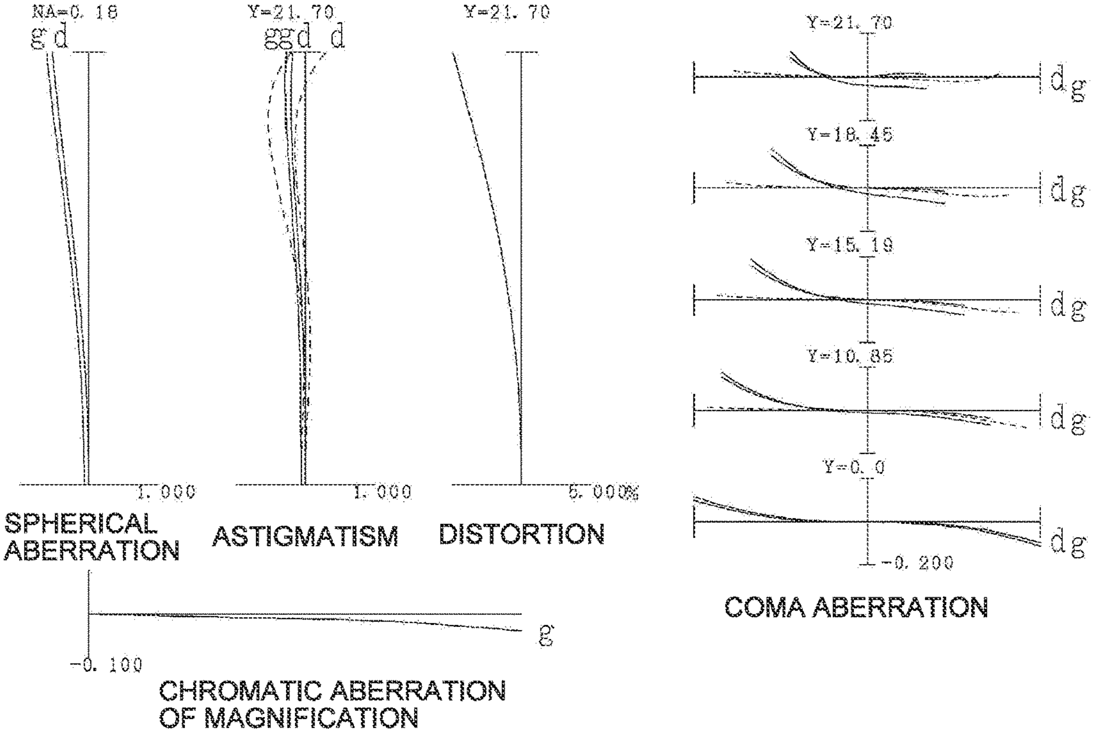

FIG. 2A illustrates graphs showing various aberrations, upon focusing on infinity, of the optical system according to the first example. FIG. 2B illustrates graphs showing various aberrations, upon focusing on the shortest photographing distance, of the optical system according to the first example. In the graphs showing various aberrations upon focusing on infinity, FNO represents the f-number and Y represents the image height. In the graphs showing various aberrations upon focusing on the shortest photographing distance, NA represents the numerical aperture and Y represents the image height. Note that in the spherical aberration graphs, the value of the f-number or numerical aperture corresponding to the widest aperture is indicated, while in the astigmatism and distortion graphs, the maximum value of the image height is indicated, and in the coma aberration graphs, values of respective image heights are indicated. Also, d represents the d-line (wavelength λ=587.6 nm), and g represents the g-line (wavelength λ=435.8 nm). In the astigmatism graphs, a solid line represents the sagittal image surface, and a dashed line represents the meridional image surface. Note that the aberration graphs of each example indicated in the following use signs similar to those of the present example, and duplicate description is omitted.

The graphs showing various aberrations demonstrate that the optical system according to the first example has excellent image forming performance, in which various aberrations are corrected favorably throughout the entire range going from focusing on infinity to focusing on the shortest photographing distance.

Second Example

Figure 3:
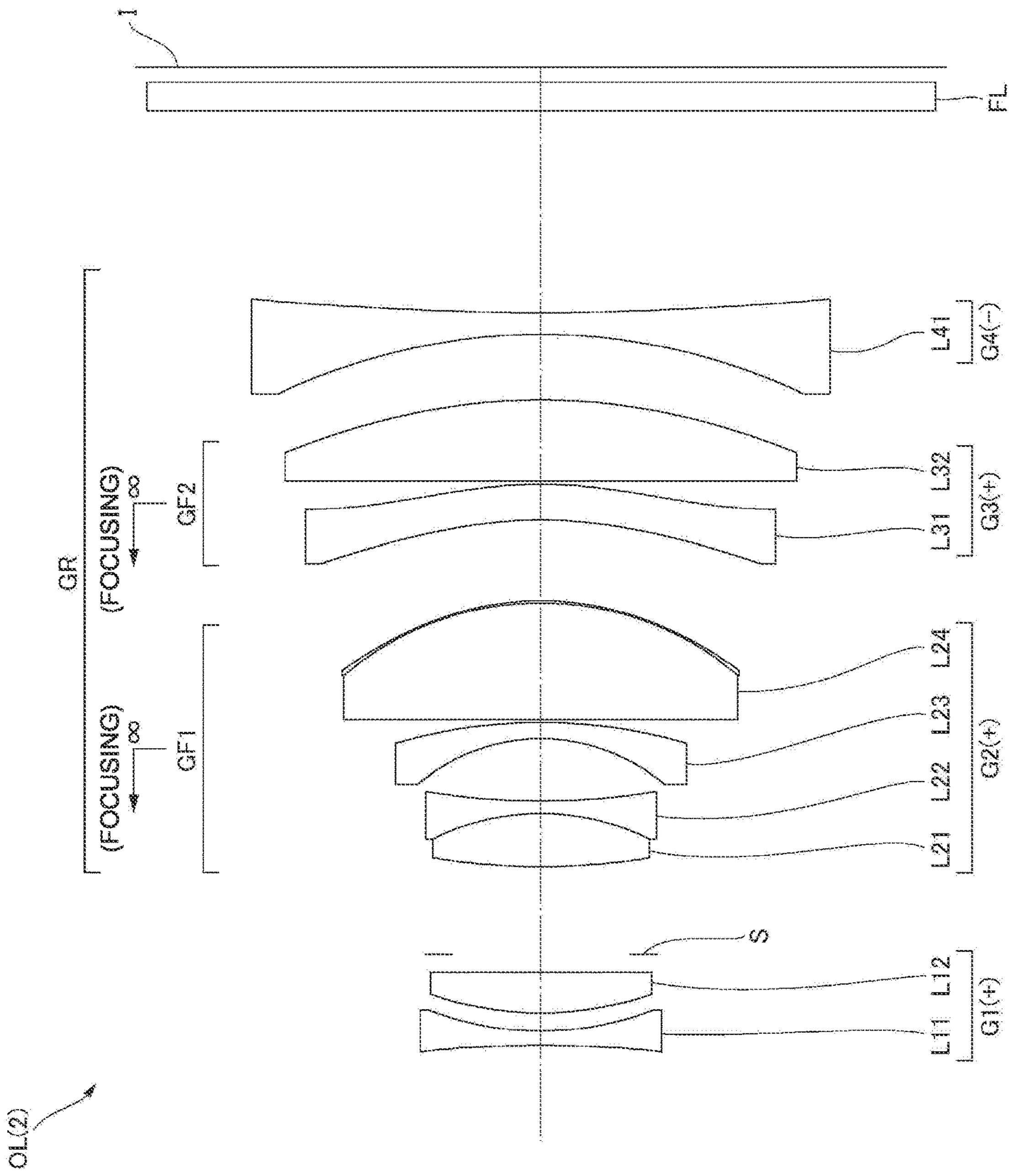
FIG. 3 is a diagram illustrating a lens configuration of an optical system according to a second example.

The second example will be described using FIGS. 3, 4A, 4B and Table 2. FIG. 3 is a diagram illustrating a lens configuration, upon focusing on infinity, of an optical system according to the second example. The optical system OL(2) according to the second example comprises a first lens group G1 with positive refractive power, an aperture stop S, a second lens group G2 with positive refractive power, a third lens group G3 with positive refractive power, and a fourth lens group G4 with negative refractive power, which are disposed in order from an object on an optical axis. When going from focusing on an object at infinity to a short distance object (object at the shortest photographing distance), the second lens group G2 and the third lens group G3 move toward the object by different movement amounts on the optical axis, and the distances between adjacent lens groups vary. Note that during focusing, the first lens group G1, the aperture stop S, and the fourth lens group G4 are locked in position relative to the image surface I.

In this example, the second lens group G2, the third lens group G3, and the fourth lens group G4 form the succeeding group GR with positive refractive power as a whole. Also, the second lens group G2 corresponds to the first focusing lens group GF1 in the succeeding group GR. The third lens group G3 corresponds to the second focusing lens group GF2 in the succeeding group GR.

The first lens group G1 comprises a negative lens L11 and a positive lens L12, which are disposed in order from the object on the optical axis.

The second lens group G2 comprises a cemented lens with positive refractive power in which a first positive lens L21 and a first negative lens L22 are cemented, a second negative lens L23, and a second positive lens L24, which are disposed in order from the object on the optical axis. The second positive lens L24 is a hybrid lens comprising a glass lens body with a resin layer provided on the surface on the image side. The surface of the resin layer on the image side is an aspherical surface, and the second positive lens L24 is a compound aspherical surface lens. In the [Lens Data] described later, surface number 11 represents the surface of the lens body on the object side, surface number 12 represents the surface of the lens body on the image side and the surface of the resin layer on the object side (the surface where the two are cemented), and surface number 13 represents the surface of the resin layer on the image side.

The third lens group G3 comprises a negative lens 31 and a positive lens 32, which are disposed in order from the object on the optical axis. The lens surface of the negative lens 31 on both sides is an aspherical surface.

The fourth lens group G4 comprises a single negative lens 41. The image surface I is disposed on the image side of the fourth lens group G4. A removable and interchangeable optical filter FL is disposed between the fourth lens group G4 and the image surface I. Also, at the image surface I, an image sensor (not illustrated) comprising a CCD, CMOS, or other type of sensor is disposed.

The following Table 2 gives data values of the optical system according to the second example.

TABLE 2

[General Data]

f = 28.824
FNO = 2.909
ω = 38.029
Y = 21.700
TL = 54.610
Bf = 0.860
Bfa = 13.138
β2 = 0.163
β3 = 0.721
β4 = 1.310

[Lens Data]

| Surface Number | R | D | nd | νd |
|---|---|---|---|---|
| Object Surface | ∞ | | | |
| 1 | −67.65263 | 0.800 | 1.53172 | 48.78 |
| 2 | 18.07229 | 1.030 | | |
| 3 | 19.61204 | 2.300 | 1.80400 | 46.60 |
| 4 | ∞ | 1.000 | | |
| 5 | ∞ | (D5) | | (Aperture Stop S) |
| 6 | 39.03942 | 3.000 | 2.00100 | 29.12 |
| 7 | −14.01800 | 0.700 | 1.80518 | 25.45 |
| 8 | 44.52125 | 3.457 | | |
| 9 | −11.08066 | 0.900 | 1.80809 | 22.74 |
| 10 | −29.93301 | 0.150 | | |
| 11 | ∞ | 6.550 | 1.80400 | 46.60 |
| 12 | −17.50329 | 0.140 | 1.56093 | 36.64 |
| 13* | −16.27553 | (D13) | | |
| 14* | −26.85154 | 2.000 | 1.53113 | 55.73 |
| 15* | −28.96313 | 0.200 | | |
| 16 | ∞ | 4.500 | 1.80400 | 46.60 |
| 17 | −36.85132 | (D17) | | |
| 18 | −34.46648 | 1.200 | 1.64769 | 33.73 |
| 19 | 173.14403 | 11.223 | | |
| 20 | ∞ | 1.600 | 1.51680 | 63.88 |
| 21 | ∞ | BF | | |
| Image Surface | ∞ | | | |

[Aspherical Surface Data]

13th Surface

κ = 1.00000E+00, A4 = 2.85655E−05, A6 = −1.38279E−08,
A8 = 5.79289E−10 A10 = 9.06875E−13, A12 = −2.25760E−15,
A14 = 1.33070E−17

14th Surface

κ = 1.00000E+00, A4 = 2.41081E−05, A6 = 9.24872E−08,
A8 = −6.64821E−10 A10 = 1.30136E−12, A12 = 8.89760E−16,
A14 = 0.00000E+00

TABLE 2-continued

15th Surface

κ = 1.00000E+00, A4 = 3.97489E−05, A6 = 2.41498E−07,
A8 = −1.14609E−09 A10 = 2.49848E−12, A12 = −2.3864E−15,
A14 = 0.00000E+00

[Variable Distance Data]

| | Infinity f = 28.824 | Short-distance β = −0.203 |
|---|---|---|
| D0 | ∞ | 135.390 |
| D5 | 4.850 | 3.169 |
| D13 | 4.450 | 1.339 |
| D17 | 3.700 | 8.492 |

[Lens Group Data]

| Group | First surface | Focal length |
|---|---|---|
| G1 | 1 | 187.243 |
| G2 | 6 | 34.689 |
| G3 | 14 | 46.577 |
| G4 | 18 | −44.279 |

Figure 4A:
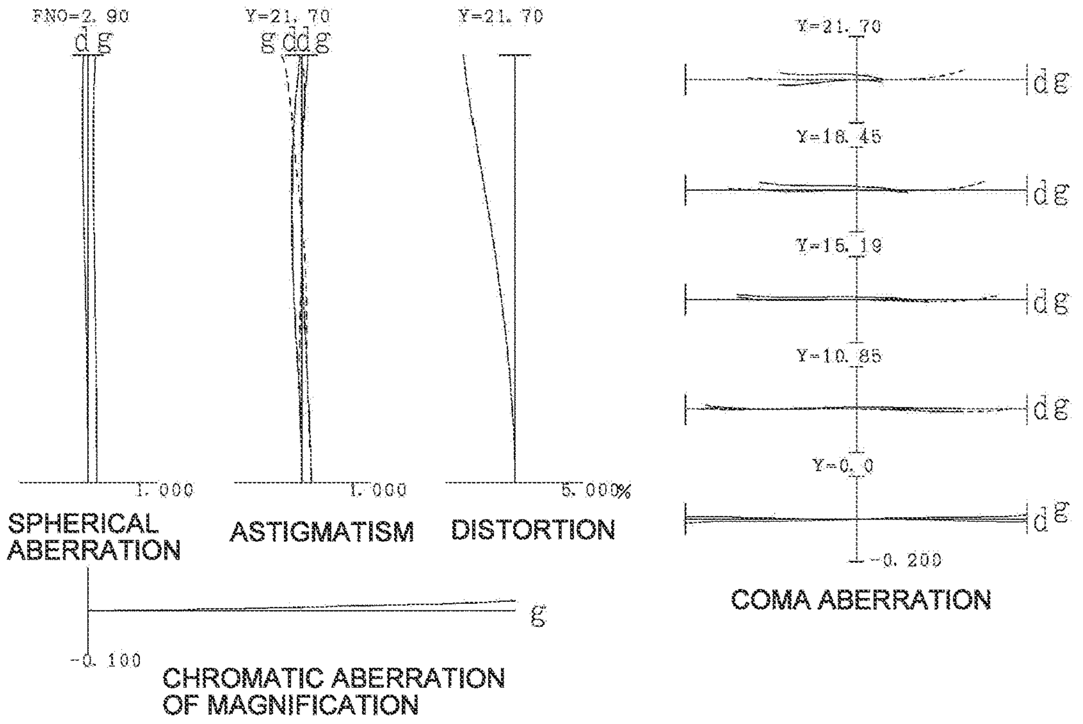
FIGS. 4A and 4B are graphs showing various aberrations of the optical system according to the second example upon focusing on infinity and upon focusing on the shortest photographing distance.
Figure 4B:
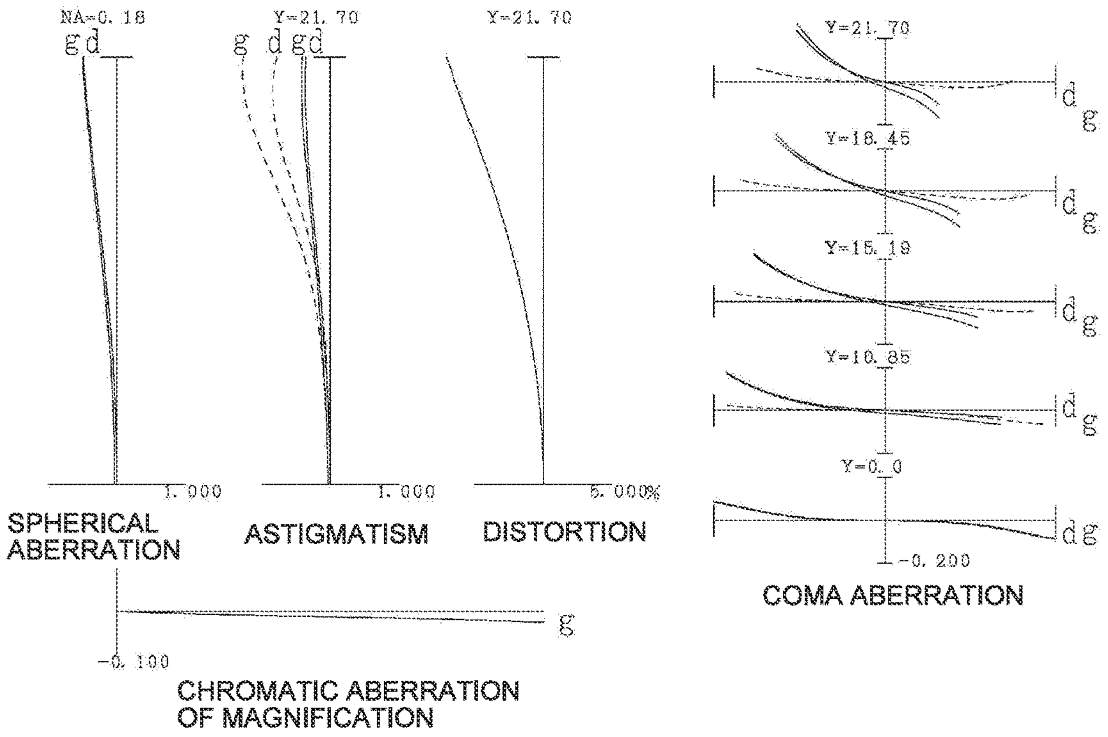

FIG. 4A illustrates graphs showing various aberrations, upon focusing on infinity, of the optical system according to the second example. FIG. 4B illustrates graphs showing various aberrations, upon focusing on the shortest photographing distance, of the optical system according to the second example. The graphs showing various aberrations demonstrate that the optical system according to the second example has excellent image forming performance, in which various aberrations are corrected favorably throughout the entire range going from focusing on infinity to focusing on the shortest photographing distance.

Third Example

Figure 5:
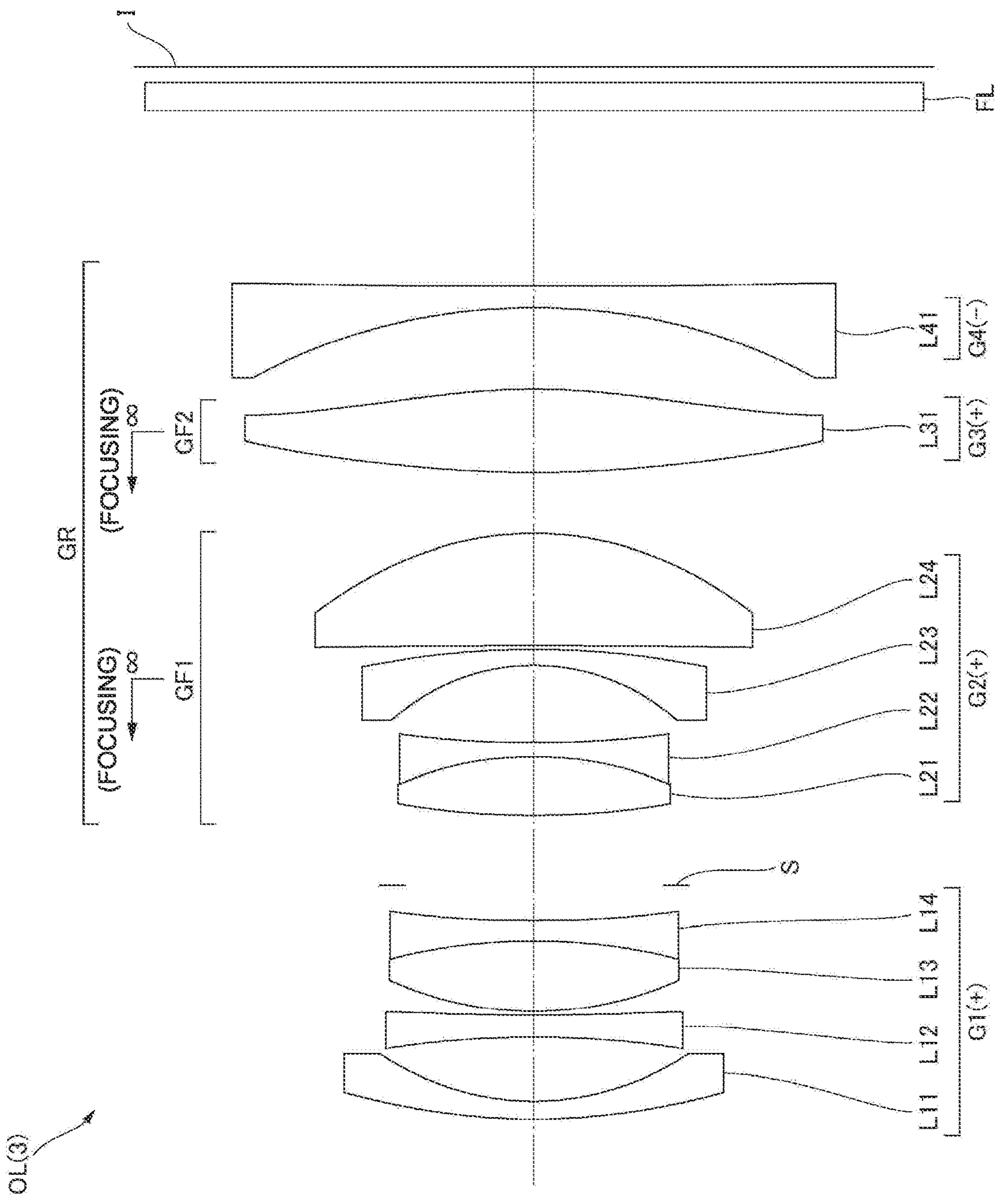
FIG. 5 is a diagram illustrating a lens configuration of an optical system according to a third example.

The third example will be described using FIGS. 5, 6A, 6B and Table 3. FIG. 5 is a diagram illustrating a lens configuration, upon focusing on infinity, of an optical system according to the third example. The optical system OL(3) according to the third example comprises a first lens group G1 with positive refractive power, an aperture stop S, a second lens group G2 with positive refractive power, a third lens group G3 with positive refractive power, and a fourth lens group G4 with negative refractive power, which are disposed in order from an object on an optical axis. When going from focusing on an object at infinity to a short distance object (object at the shortest photographing distance), the second lens group G2 and the third lens group G3 move toward the object by different movement amounts on the optical axis, and the distances between adjacent lens groups vary. Note that during focusing, the first lens group G1, the aperture stop S, and the fourth lens group G4 are locked in position relative to the image surface I.

In this example, the second lens group G2, the third lens group G3, and the fourth lens group G4 form the succeeding group GR with positive refractive power as a whole. Also, the second lens group G2 corresponds to the first focusing lens group GF1 in the succeeding group GR. The third lens group G3 corresponds to the second focusing lens group GF2 in the succeeding group GR.

The first lens group G1 comprises a first negative lens L11, a second negative lens L12, and a cemented lens with positive refractive power in which a positive lens L13 and a third negative lens L14 are cemented, which are disposed in order from the object on the optical axis. The lens surface of the second negative lens L12 on both sides is an aspherical surface.

The second lens group G2 comprises a cemented lens with positive refractive power in which a first positive lens L21 and a first negative lens L22 are cemented, a second negative lens L23, and a second positive lens L24, which are disposed in order from the object on the optical axis. The lens surface of the second positive lens L24 on the image side is an aspherical surface.

The third lens group G3 comprises a single positive lens 31. The lens surface of the positive lens 31 on the image side is an aspherical surface.

The fourth lens group G4 comprises a single negative lens 41. The image surface I is disposed on the image side of the fourth lens group G4. A removable and interchangeable optical filter FL is disposed between the fourth lens group G4 and the image surface I. Also, at the image surface I, an image sensor (not illustrated) comprising a CCD, CMOS, or other type of sensor is disposed.

The following Table 3 gives data values of the optical system according to the third example.

TABLE 3

[General Data]

f = 28.805
FNO = 2.067
ω = 37.270
Y = 21.700
TL = 59.500
Bf = 0.800
Bfa = 11.855
β2 = 0.427
β3 = 0.565
β4 = 1.245

[Lens Data]

| Surface Number | R | D | nd | νd |
|---|---|---|---|---|
| Object Surface | ∞ | | | |
| 1 | 40.41078 | 1.000 | 1.48749 | 70.31 |
| 2 | 16.22403 | 3.600 | | |
| 3* | −70.24185 | 1.300 | 1.82115 | 24.06 |
| 4* | 148.16663 | 0.200 | | |
| 5 | 20.51937 | 4.000 | 1.88300 | 40.66 |
| 6 | −32.92528 | 1.100 | 1.59270 | 35.27 |
| 7 | 65.09547 | 2.000 | | |
| 8 | ∞ | (D8) | | (Aperture Stop S) |
| 9 | 44.75110 | 3.300 | 2.00100 | 29.12 |
| 10 | −20.22294 | 0.800 | 1.75520 | 27.57 |
| 11 | 61.74745 | 4.400 | | |
| 12 | −12.31509 | 0.900 | 1.84666 | 23.80 |
| 13 | −49.27479 | 0.200 | | |
| 14 | −1190.54970 | 6.300 | 1.76802 | 49.23 |
| 15* | −19.49783 | (D15) | | |
| 16 | 76.50071 | 4.700 | 1.77377 | 47.18 |
| 17* | −42.68869 | (D17) | | |
| 18 | −34.74758 | 1.200 | 1.64769 | 33.73 |
| 19 | 714.84773 | 10.000 | | |
| 20 | ∞ | 1.600 | 1.51680 | 63.88 |
| 21 | ∞ | BF | | |
| Image Surface | ∞ | | | |

[Aspherical Surface Data]

3rd Surface

κ = 1.00000E+00, A4 = −3.81302E−05, A6 = 1.79518E−07,
A8 = 0.00000E+00 A10 = 0.00000E+00, A12 = 0.00000E+00,
A14 = 0.00000E+00

TABLE 3-continued

4th Surface

κ = 1.00000E+00, A4 = −2.32360E−05, A6 = 2.17814E−07,
A8 = 2.83578E−10 A10 = 0.00000E+00, A12 = 0.00000E+00,
A14 = 0.00000E+00

15th Surface

κ = 1.00000E+00, A4 = −3.48371E−06, A6 = 1.39242E−08,
A8 = 1.83753E−10 A10 = 2.97697E−13, A12 = 0.00000E+00,
A14 = 0.00000E+00

17th Surface

κ = 1.00000E+00, A4 = 2.81807E−05, A6 = −1.57952E−08,
A8 = 4.54301E−11 A10 = −1.20045E−13, A12 = 0.00000E+00,
A14 = 0.00000E+00

[Variable Distance Data]

| | Infinity f = 28.805 | Short-distance β = −0.124 |
|---|---|---|
| D0 | ∞ | 220.500 |
| D8 | 4.000 | 3.015 |
| D15 | 3.500 | 1.629 |
| D17 | 4.600 | 7.456 |

[Lens Group Data]

| Group | First surface | Focal length |
|---|---|---|
| G1 | 1 | 95.848 |
| G2 | 9 | 63.426 |
| G3 | 16 | 36.030 |
| G4 | 18 | −51.129 |

Figure 6A:
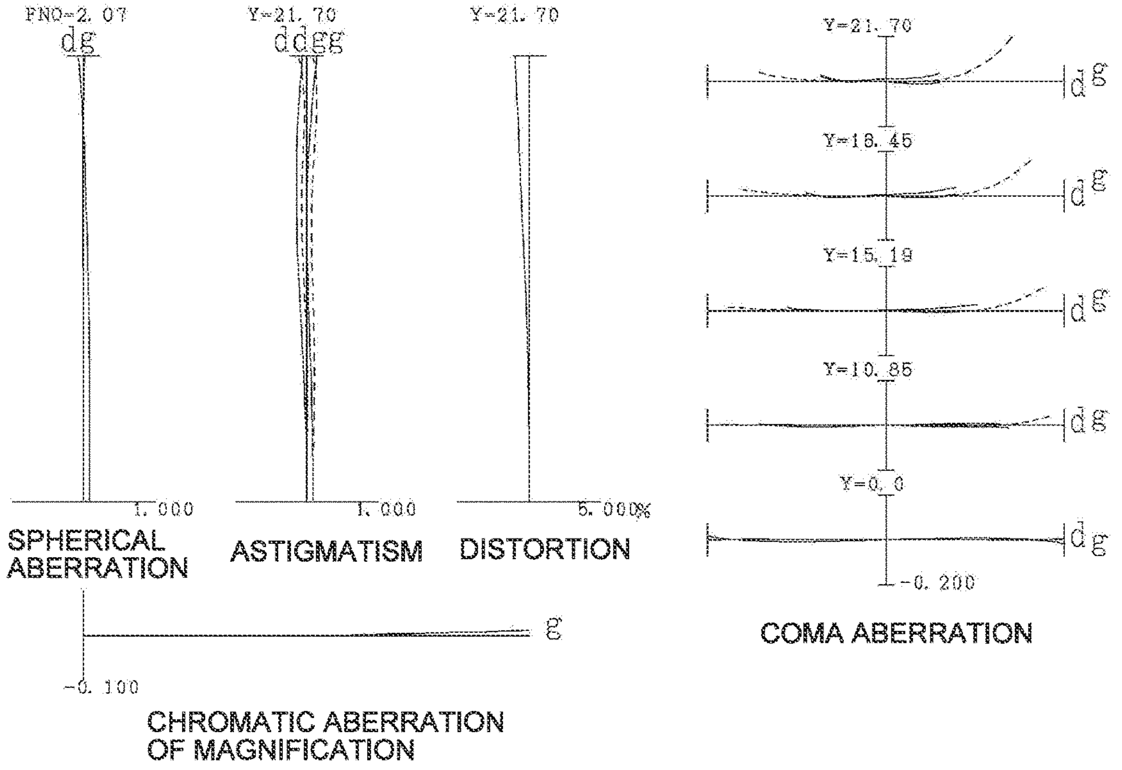
FIGS. 6A and 6B are graphs showing various aberrations of the optical system according to the third example upon focusing on infinity and upon focusing on the shortest photographing distance.
Figure 6B:
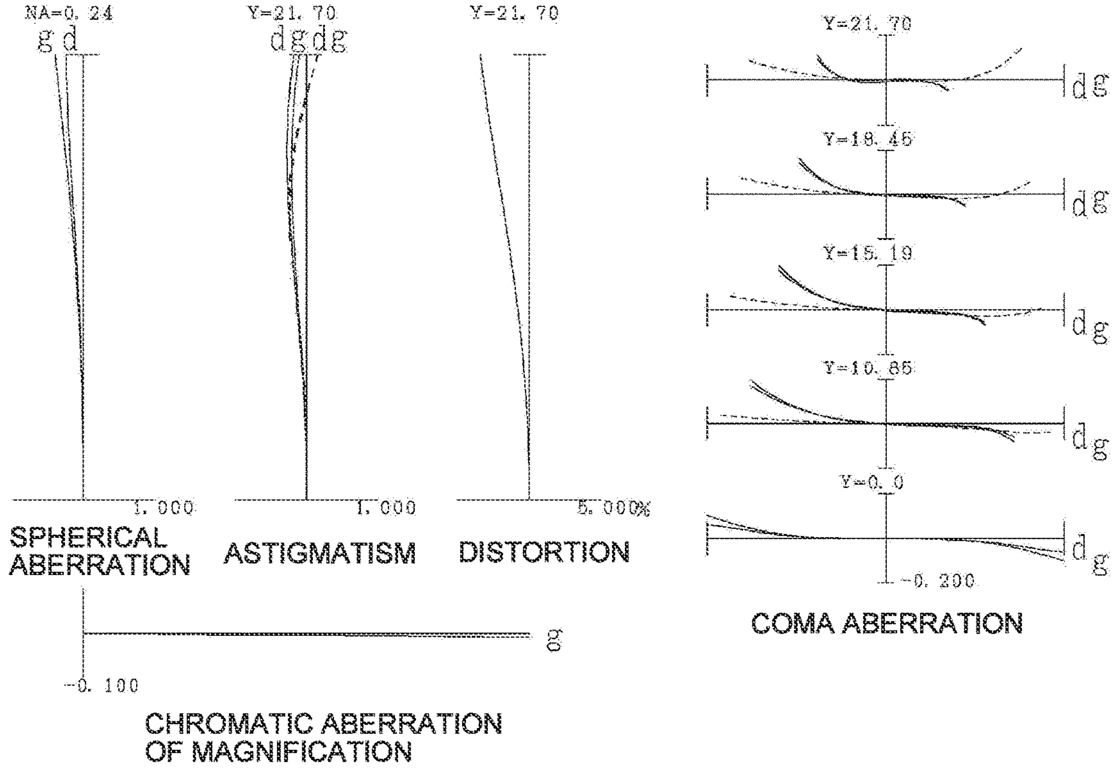

FIG. 6A illustrates graphs showing various aberrations, upon focusing on infinity, of the optical system according to the third example. FIG. 6B illustrates graphs showing various aberrations, upon focusing on the shortest photographing distance, of the optical system according to the third example. The graphs showing various aberrations demonstrate that the optical system according to the third example has excellent image forming performance, in which various aberrations are corrected favorably throughout the entire range going from focusing on infinity to focusing on the shortest photographing distance.

Fourth Example

Figure 7:
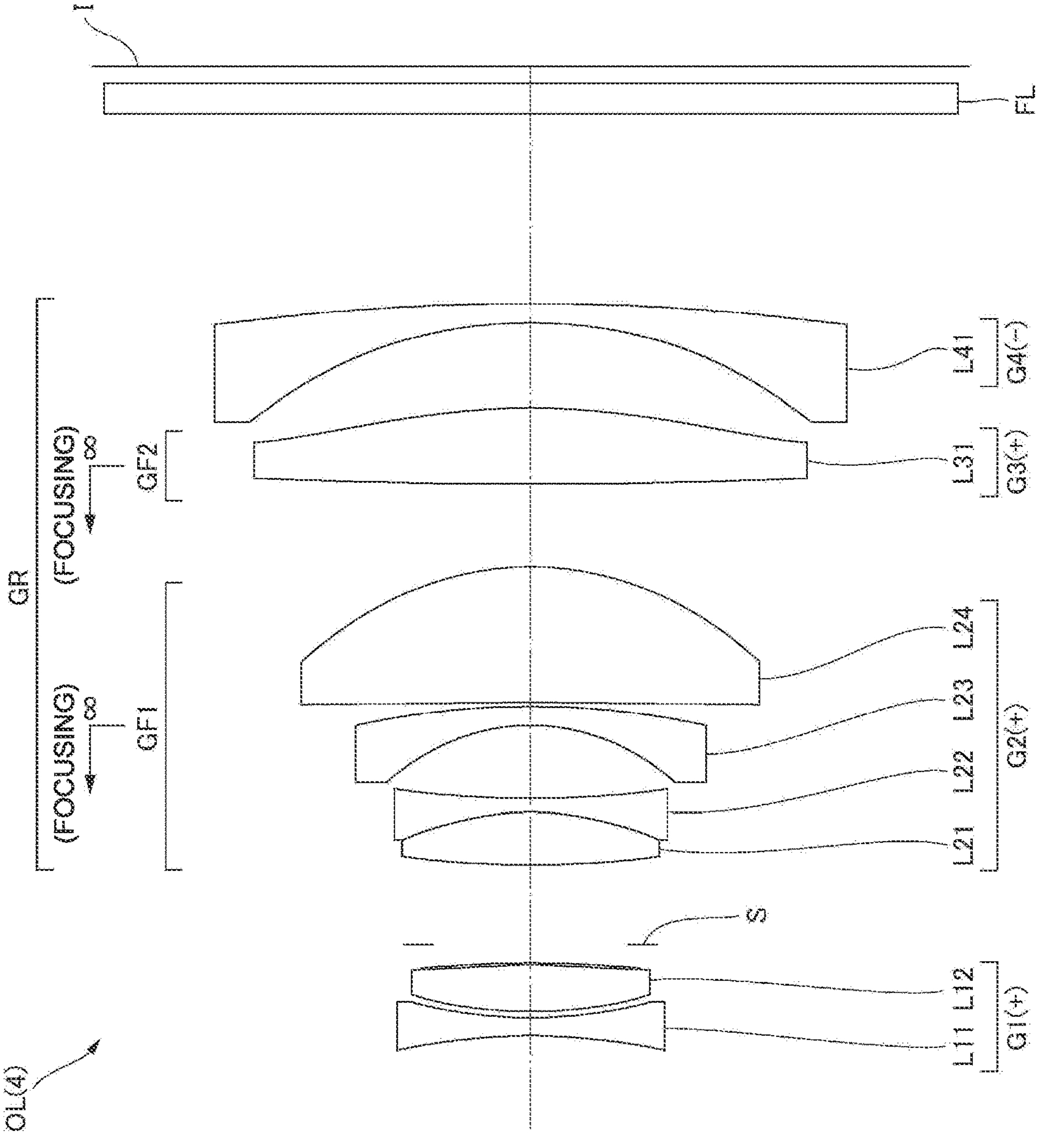
FIG. 7 is a diagram illustrating a lens configuration of an optical system according to a fourth example.

The fourth example will be described using FIGS. 7, 8A, 8B and Table 4. FIG. 7 is a diagram illustrating a lens configuration, upon focusing on infinity, of an optical system according to the fourth example. The optical system OL(4) according to the fourth example comprises a first lens group G1 with positive refractive power, an aperture stop S, a second lens group G2 with positive refractive power, a third lens group G3 with positive refractive power, and a fourth lens group G4 with negative refractive power, which are disposed in order from an object on an optical axis. When going from focusing on an object at infinity to a short distance object (object at the shortest photographing distance), the second lens group G2 and the third lens group G3 move toward the object by different movement amounts on the optical axis, and the distances between adjacent lens groups vary. Note that during focusing, the first lens group G1, the aperture stop S, and the fourth lens group G4 are locked in position relative to the image surface I.

In this example, the second lens group G2, the third lens group G3, and the fourth lens group G4 form the succeeding group GR with positive refractive power as a whole. Also, the second lens group G2 corresponds to the first focusing lens group GF1 in the succeeding group GR. The third lens group G3 corresponds to the second focusing lens group GF2 in the succeeding group GR.

The first lens group G1 comprises a negative lens L11 and a positive lens L12, which are disposed in order from the object on the optical axis. The positive lens L12 is a hybrid lens comprising a glass lens body with a resin layer provided on the surface on the image side. The surface of the resin layer on the image side is an aspherical surface, and the positive lens L12 is a compound aspherical surface lens. In the [Lens Data] described later, surface number 3 represents the surface of the lens body on the object side, surface number 4 represents the surface of the lens body on the image side and the surface of the resin layer on the object side (the surface where the two are cemented), and surface number 5 represents the surface of the resin layer on the image side.

The second lens group G2 comprises a cemented lens with positive refractive power in which a first positive lens L21 and a first negative lens L22 are cemented, a second negative lens L23, and a second positive lens L24, which are disposed in order from the object on the optical axis. The lens surface of the second positive lens L24 on the image side is an aspherical surface.

The third lens group G3 comprises a single positive lens 31. The lens surface of the positive lens 31 on the image side is an aspherical surface.

The fourth lens group G4 comprises a single negative lens 41. The image surface I is disposed on the image side of the fourth lens group G4. A removable and interchangeable optical filter FL is disposed between the fourth lens group G4 and the image surface I. Also, at the image surface I, an image sensor (not illustrated) comprising a CCD, CMOS, or other type of sensor is disposed.

The following Table 4 gives data values of the optical system according to the fourth example.

TABLE 4

[General Data]

f = 28.802
FNO = 2.861
ω = 37.036
Y = 21.700
TL = 50.042
Bf = 0.860
Bfa = 11.697
β2 = 0.406
β3 = 0.679
β4 = 1.248

[Lens Data]

| Surface Number | R | D | nd | νd |
|---|---|---|---|---|
| Object Surface | ∞ | | | |
| 1 | −33.60557 | 0.900 | 1.59270 | 35.27 |
| 2 | 24.37821 | 0.300 | | |
| 3 | 21.36640 | 2.400 | 1.84850 | 43.79 |
| 4 | −64.21743 | 0.100 | 1.56093 | 36.64 |
| 5* | −64.21743 | 1.000 | | |
| 6 | ∞ | (D6) | | (Aperture Stop S) |
| 7 | 48.57194 | 2.700 | 2.00100 | 29.12 |
| 8 | −16.54854 | 0.700 | 1.71736 | 29.57 |
| 9 | 50.38696 | 3.800 | | |
| 10 | −11.12244 | 1.000 | 1.80809 | 22.74 |
| 11 | −43.70934 | 0.200 | | |
| 12 | −628.97652 | 7.000 | 1.75501 | 51.15 |
| 13* | −16.56020 | (D13) | | |
| 14 | 326.40430 | 3.900 | 1.76802 | 49.23 |
| 15* | −38.59856 | (D15) | | |
| 16 | −23.79495 | 1.000 | 1.58144 | 40.98 |
| 17 | −129.23419 | 9.782 | | |
| 18 | ∞ | 1.600 | 1.51680 | 63.88 |
| 19 | ∞ | BF | | |
| Image Surface | ∞ | | | |

[Aspherical Surface Data]

5th Surface

κ = 5.65120E+00, A4 = 1.32957E−05, A6 = 3.71890E−08,
A8 = 0.00000E+00 A10 = 0.00000E+00, A12 = 0.00000E+00,
A14 = 0.00000E+00

13th Surface

κ = −5.67700E−01, A4 = −1.05001E−05, A6 = −8.81582E−08,
A8 = 4.96402E−10 A10 = −7.84585E−13, A12 = 0.00000E+00,
A14 = 0.00000E+00

15th Surface

κ = 1.00000E+00, A4 = 1.63200E−05, A6 = 5.26856E−08,
A8 = −1.38087E−10 A10 = 2.83555E−13, A12 = 0.00000E+00,
A14 = 0.00000E+00

[Variable Distance Data]

| | Infinity f = 28.802 | Short-distance β = −0.199 |
|---|---|---|
| D0 | ∞ | 139.958 |
| D6 | 4.100 | 2.428 |
| D13 | 4.300 | 0.956 |
| D15 | 4.400 | 9.416 |

[Lens Group Data]

| Group | First surface | Focal length |
|---|---|---|
| G1 | 1 | 83.642 |
| G2 | 7 | 47.380 |
| G3 | 14 | 45.152 |
| G4 | 16 | −50.335 |

Figure 8A:
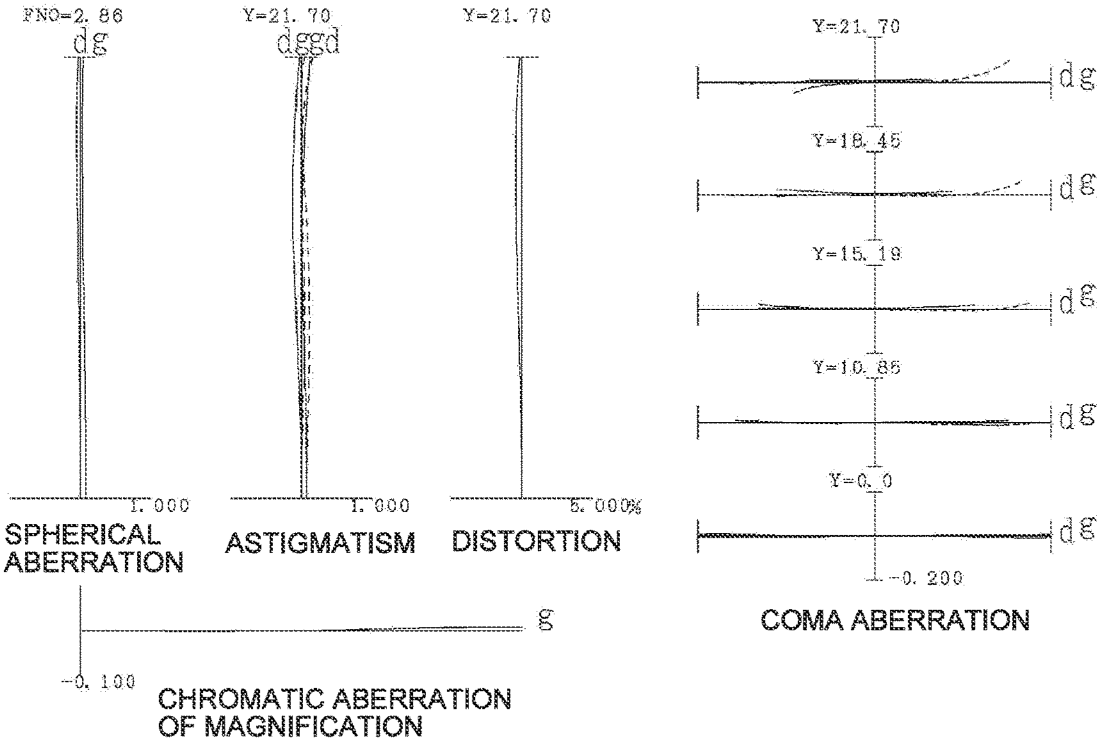
FIGS. 8A and 8B are graphs showing various aberrations of the optical system according to the fourth example upon focusing on infinity and upon focusing on the shortest photographing distance.
Figure 8B:
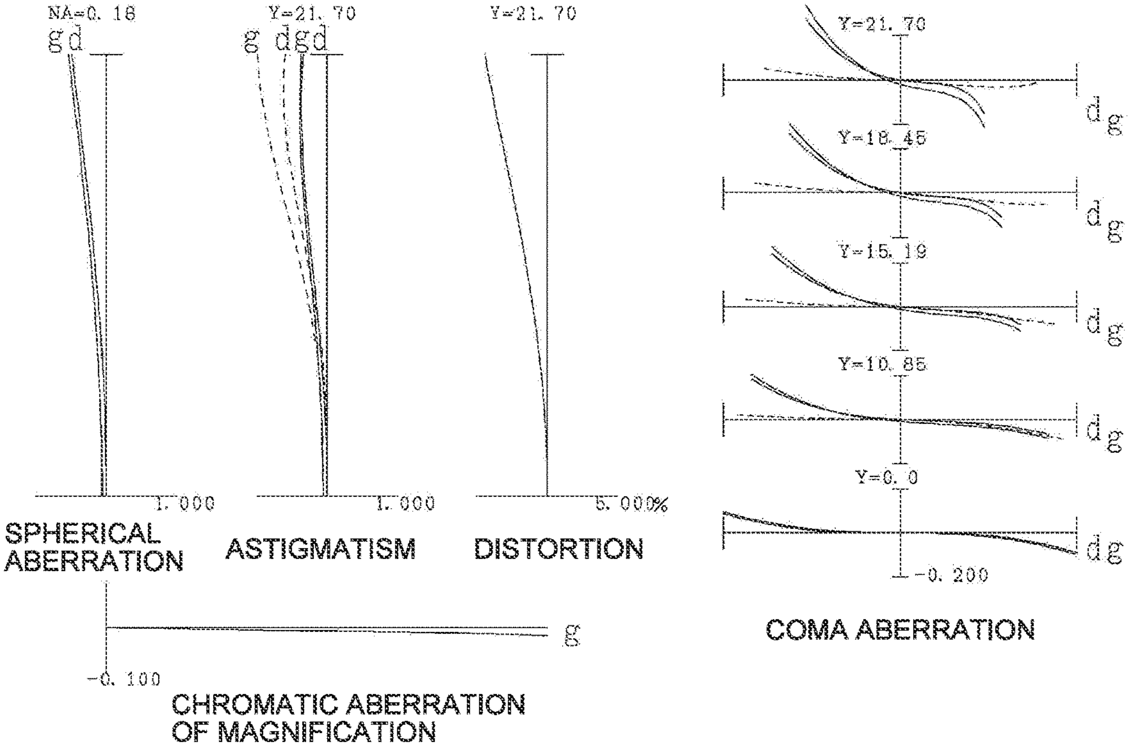

FIG. 8A illustrates graphs showing various aberrations, upon focusing on infinity, of the optical system according to the fourth example. FIG. 8B illustrates graphs showing various aberrations, upon focusing on the shortest photographing distance, of the optical system according to the fourth example. The graphs showing various aberrations demonstrate that the optical system according to the fourth example has excellent image forming performance, in which various aberrations are corrected favorably throughout the entire range going from focusing on infinity to focusing on the shortest photographing distance.

Next, a [Conditional Expression Corresponding Value] table is given below. This table summarizes the values corresponding to conditional expressions (1) to (15) for all examples (first to fourth examples).

$0.03<D1/TL<0.25$ Conditional Expression (1)

$1.20<(-f4)/f<2.00$ Conditional Expression (2)

$1.10<\beta 4<1.40$ Conditional Expression (3)

$28.0<\nu d41<45.0$ Conditional Expression (4)

$0.50<f2/f3<2.00$ Conditional Expression (5)

$0.04<d23/TL<0.11$ Conditional Expression (6)

$0.60<d23/d12<1.00$ Conditional Expression (7)

$$0.10<\beta 2/\beta 3<0.90 \qquad \text{Conditional Expression (8)}$$

$$0.015<\{\beta 2+(1/\beta 2)\}^{-2}<0.170 \qquad \text{Conditional Expression (9)}$$

$$0.100<\{\beta 3+(1/\beta 3)\}^{-2}<0.250 \qquad \text{Conditional Expression (10)}$$

$$0.00<N21-N22<0.40 \qquad \text{Conditional Expression (11)}$$

$$N21>1.90 \qquad \text{Conditional Expression (12)}$$

$$25.0<\nu d21<35.0 \qquad \text{Conditional Expression (13)}$$

$$-1.20<(R31+R32)/(R32-R31)<0.00 \qquad \text{Conditional Expression (14)}$$

$$0.00<f/f1<0.70 \qquad \text{Conditional Expression (15)}$$

[Conditional Expression Corresponding Value]

| Conditional Expression | First Example | Second Example | Third Example | Fourth Example |
|---|---|---|---|---|
| (1) | 0.076 | 0.076 | 0.188 | 0.074 |
| (2) | 1.641 | 1.536 | 1.775 | 1.748 |
| (3) | 1.266 | 1.310 | 1.245 | 1.248 |
| (4) | 32.190 | 33.730 | 33.730 | 40.980 |
| (5) | 1.794 | 0.745 | 1.760 | 1.049 |
| (6) | 0.086 | 0.081 | 0.059 | 0.086 |
| (7) | 0.887 | 0.761 | 0.700 | 0.843 |
| (8) | 0.772 | 0.226 | 0.756 | 0.598 |
| (9) | 0.136 | 0.025 | 0.130 | 0.122 |
| (10) | 0.186 | 0.225 | 0.183 | 0.216 |
| (11) | 0.273 | 0.196 | 0.246 | 0.284 |
| (12) | 2.001 | 2.001 | 2.001 | 2.001 |
| (13) | 29.120 | 29.120 | 29.120 | 29.120 |
| (14) | −0.876 | −1.000 | −0.284 | −0.789 |
| (15) | 0.319 | 0.154 | 0.301 | 0.344 |

According to the above examples, the entire length of the optical system is shortened with respect to the focal length, and an optical system that is compact while having favorable optical performance can be achieved.

The above examples are illustrations of concrete examples of the invention of the present application, and the invention of the present application is not limited thereto.

The following content may be adopted, as appropriate, within a scope that does not impair the optical performance of an optical system according to the embodiments.

Although four-group configurations are illustrated as examples of an optical system according to the embodiments, this application is not limited thereto, and a zoom optical system with another group configuration (such as five-group, for example) can be configured. Specifically, a configuration is possible in which a lens or a lens group is added closest to the object or closest to the image surface in an optical system according to the embodiments. Note that a lens group refers to a portion comprising at least one lens and separated by an air distance that varies during focusing.

A lens group or a partial lens group may also be moved to have a component in the direction perpendicular to the optical axis, or rotated (pivoted) in the direction in the plane containing the optical axis, as a vibration-proof lens group to correct image blur caused by camera shake.

The lens surface may be formed into a spherical or planar surface, and may also be formed into an aspherical surface. The case of a spherical or planar lens surface is preferable because it facilitates lens processing and assembly adjustment, and prevents degradation in optical performance due to processing and assembly adjustment errors. Moreover, it is preferable because degradation in imaging performance is minimal even if the image surface is shifted.

In the case in which the lens surface is an aspherical surface, the aspherical surface may be an aspherical surface made by grinding, a glass-molded aspherical surface made by molding glass into the shape of an aspherical surface, or a composite-type aspherical surface made by molding resin into the shape of an aspherical surface on the surface of glass. Moreover, the lens surface may also be a diffractive surface, and the lens may be a gradient-index lens (GRIN lens) or a plastic lens.

The aperture stop is preferably disposed between the first lens group and the second lens group, but the frame of a lens may also serve in place of the aperture stop, without providing a member as the aperture stop.

Each lens surface may also be coated with an antireflection coating having a high transmittance over a wide wavelength range to reduce flare and ghosting and achieve high-contrast optical performance.

| EXPLANATION OF NUMERALS AND CHARACTERS | |
|---|---|
| G1: first lens group | G2: second lens group |
| G3: third lens group | G4: fourth lens group |
| I: image surface | S: aperture stop |

The invention claimed is:

1. An optical system comprising:

a first lens group with positive refractive power, an aperture stop, and a succeeding group, which are disposed in order from an object on an optical axis, the succeeding group comprising a first focusing lens group and a second focusing lens group disposed closer to an image than the first focusing lens group, the first focusing lens group and the second focusing lens group being configured to move with different movement amounts on the optical axis during focusing, wherein the following conditional expression is satisfied:

$$0.03<D1/TL<0.25$$

where

D1: distance on the optical axis from lens surface closest to the object to lens surface closest to the image in the first lens group TL: distance on the optical axis from lens surface closest to the object of the optical system to an image plane.

2. The optical system according to claim 1, wherein the succeeding group comprises a second lens group with positive refractive power and a third lens group with positive refractive power, which are disposed in order from the object on the optical axis, the second lens group is the first focusing lens group, and the third lens group is the second focusing lens group.

3. The optical system according to claim 2, wherein the succeeding group comprises a fourth lens group with negative refractive power disposed on an image side of the third lens group.

4. The optical system according to claim 3, wherein the following conditional expression is satisfied:

$$1.20<(-f4)/f<2.00$$

where f4: focal length of the fourth lens group f: focal length of the optical system.

5. The optical system according to claim 3, wherein the following conditional expression is satisfied:

$$1.10<\beta 4<1.40$$

where

β4: lateral magnification of the fourth lens group upon focusing on infinity.

6. The optical system according to claim 3, wherein the fourth lens group consists of a single negative lens, and the following conditional expression is satisfied:

$$28.0<\nu d41<45.0$$

where

νd41: Abbe number based on d-line of the negative lens of the fourth lens group.

7. The optical system according to claim 2, wherein the following conditional expression is satisfied:

$$0.50<f2/f3<2.00$$

where f2: focal length of the second lens group f3: focal length of the third lens group.

8. The optical system according to claim 3, wherein the following conditional expression is satisfied:

$$0.04<d23/TL<0.11$$

where d23: distance on the optical axis between the second lens group and the third lens group upon focusing on infinity TL: the distance on the optical axis from the lens surface closest to the object of the optical system to the image plane.

9. The optical system according to claim 2, wherein the following conditional expression is satisfied:

$$0.60<d23/d12<1.00$$

where d23: distance on the optical axis between the second lens group and the third lens group upon focusing on infinity d12: distance on the optical axis between the first lens group and the second lens group upon focusing on infinity.

10. The optical system according to claim 2, wherein the following conditional expression is satisfied:

$$0.10<\beta 2/\beta 3<0.90$$

where

β2: lateral magnification of the second lens group upon focusing on infinity

β3: lateral magnification of the third lens group upon focusing on infinity.

11. The optical system according to claim 2, wherein the following conditional expression is satisfied:

$$0.015<\{\beta 2+(1/\beta 2)\}^{31\ 2}<0.170$$

where

β2: lateral magnification of the second lens group upon focusing on infinity.

12. The optical system according to claim 2, wherein the following conditional expression is satisfied:

$$0.100<\{\beta 3+(1/\beta 3)\}^{-2}<0.250$$

where

β3: lateral magnification of the third lens group upon focusing on infinity.

13. The optical system according to claim 2, wherein the third lens group comprises a single positive lens, and the following conditional expression is satisfied:

$$-1.20<(R31+R32)/(R32-R31)<0.00$$

where

R31: paraxial radius of curvature of a lens surface on object side of the positive lens of the third lens group R32: paraxial radius of curvature of a lens surface on image side of the positive lens of the third lens group.

14. The optical system according to claim 1, wherein the following conditional expression is satisfied:

$$0.00<f/f1<0.70$$

where f: focal length of the optical system f1: focal length of the first lens group.

15. An optical apparatus comprising the optical system according to claim 1.

16. An optical system comprising:

a first lens group with positive refractive power, and a succeeding group, which are disposed in order from an object on an optical axis, the succeeding group comprises a second lens group with positive refractive power and a third lens group with positive refractive power, which are disposed in order from the object on the optical axis, the second lens group is a first focusing lens group that moves on the optical axis during focusing, the third lens group is a second focusing lens group that moves on the optical axis during focusing, and the second lens group consists of a first positive lens, a first negative lens, a second negative lens, and a second positive lens, which are disposed in order from the object on the optical axis, wherein the following conditional expression is satisfied:

$$0.03<D1/TL<0.25$$

where

D1: distance on the optical axis from lens surface closest to the object to a lens surface closest to an image in the first lens group TL: distance on the optical axis from lens surface closest to the object of the optical system to an image plane.

17. The optical system according to claim 16, wherein the following conditional expression is satisfied:

$$0.00<N21-N22<0.40$$

where

N21: refractive index for d-line of the first positive lens of the second lens group N22: refractive index for d-line of the first negative lens of the second lens group.

18. The optical system according to claim 16, wherein the following conditional expressions are satisfied:

$$N21>1.90$$

$$25.0<\nu d21<35.0$$

where

N21: refractive index for d-line of the first positive lens of the second lens group νd21: Abbe number based on d-line of the first positive lens of the second lens group.

19. A method for manufacturing an optical system, comprising one of the following steps A, B, C and D, wherein the step A comprises:

disposing a first lens group with positive refractive power, an aperture stop, and a succeeding group in a lens barrel in order from an object on an optical axis, configuring the succeeding group to comprise a first focusing lens group and a second focusing lens group disposed closer to an image than the first focusing lens group, the first focusing lens group and the second focusing lens group being configured to move with different movement amounts on the optical axis during focusing, and satisfying the following conditional expression:

$$0.03<D1/TL<0.25$$

where

D1: distance on the optical axis from lens surface closest to the object to lens surface closest to the image in the first lens group TL: distance on the optical axis from lens surface closest to the object of the optical system to an image plane, the step B comprises:

disposing a first lens group with positive refractive power, and a succeeding group in a lens barrel in order from an object on an optical axis, configuring the succeeding group to comprise a second lens group with positive refractive power and a third lens group with positive refractive power, which are disposed in order from the object on the optical axis, the second lens group is a first focusing lens group that moves on the optical axis during focusing, the third lens group is a second focusing lens group that moves on the optical axis during focusing, and the second lens group consists of a first positive lens, a first negative lens, a second negative lens, and a second positive lens, which are disposed in order from the object on the optical axis, and satisfying the following conditional expression:

$$0.03<D1/TL<0.25$$

where

D1: distance on the optical axis from lens surface closest to the object to lens surface closest to an image in the first lens group TL: distance on the optical axis from lens surface closest to the object of the optical system to an image plane the step C comprises:

disposing a first lens group with positive refractive power, and a succeeding group in a lens barrel in order from an object on an optical axis, configuring the succeeding group to comprise a first focusing lens group and a second focusing lens group disposed closer to an image than the first focusing lens group, the first focusing lens group and the second focusing lens group being configured to move with different movement amounts on the optical axis during focusing, and satisfying the following conditional expression:

$$0.07<D1/TL<0.25$$

where

D1: distance on the optical axis from lens surface closest to the object to lens surface closest to the image in the first lens group TL: distance on the optical axis from lens surface closest to the object of the optical system to an image plane, and the step D comprises:

disposing a first lens group with positive refractive power, a second lens group with positive refractive power, a third lens group with positive refractive power, and a fourth lens group with negative refractive power in a lens barrel in order from an object on an optical axis, so that during focusing, distances between adjacent lens groups vary, and satisfying the following conditional expressions:

$$1.20<(-f4)/f<2.00$$

$$0.50<f2/f3<2.00$$

where f4: focal length of the fourth lens group, f: focal length of the optical system, f2: focal length of the second lens group, and f3: focal length of the third lens group.

20. An optical system comprising:

a first lens group with positive refractive power, and a succeeding group, which are disposed in order from an object on an optical axis, the succeeding group comprising a first focusing lens group and a second focusing lens group disposed closer to an image than the first focusing lens group, the first focusing lens group and the second focusing lens group being configured to move with different movement amounts on the optical axis during focusing, wherein the following conditional expression is satisfied:

$$0.07<D1/TL<0.25$$

where

D1: distance on the optical axis from lens surface closest to the object to lens surface closest to the image in the first lens group TL: distance on the optical axis from lens surface closest to the object of the optical system to an image plane.

21. An optical system comprising:

a first lens group with positive refractive power, a second lens group with positive refractive power, a third lens group with positive refractive power, and a fourth lens group with negative refractive power, which are disposed in order from an object on an optical axis, wherein during focusing, distances between adjacent lens groups vary, and the following conditional expressions are satisfied:

$$1.20<(-f4)/f<2.00$$

$$0.50<f2/f3<2.00$$

where f4: focal length of the fourth lens group, f: focal length of the optical system, f2: focal length of the second lens group, and f3: focal length of the third lens group.

22. The optical system according to claim 21, wherein the succeeding group comprises a second lens group with positive refractive power and a third lens group with positive refractive power, which are disposed in order from the object on the optical axis, the second lens group is a first focusing lens group, and the third lens group is a second focusing lens group.

23. The optical system according to claim 21, wherein the following conditional expression is satisfied:

$$0.03<D1/TL<0.25$$

where

D1: distance on the optical axis from lens surface closest to the object to lens surface closest to an image in the first lens group TL: distance on the optical axis from lens surface closest to the object of the optical system to an image plane.

24. An optical system comprising:

a first lens group with positive refractive power, a second lens group with positive refractive power, a third lens group with positive refractive power, and a fourth lens group with negative refractive power, which are disposed in order from an object on an optical axis, wherein during focusing, distances between adjacent lens groups vary, and the second lens group consists of a first positive lens, a first negative lens, a second negative lens, and a second positive lens, which are disposed in order from the object on the optical axis.

* * * * *